(12) United States Patent
Lauzier et al.

(10) Patent No.: US 12,534,142 B2
(45) Date of Patent: Jan. 27, 2026

(54) TRACK SYSTEM FOR TRACTION OF A VEHICLE

(71) Applicant: CAMSO INC., Magog (CA)

(72) Inventors: Jonathan Lauzier, Sherbrooke (CA); Jeremi Bourdeau, Sherbrooke (CA); Dewaine Kautsch, Jefferson City, MO (US)

(73) Assignee: Camso Inc., Magog (CA)

( * ) Notice: Subject to any disclaimer, the term of this patent is extended or adjusted under 35 U.S.C. 154(b) by 800 days.

(21) Appl. No.: 17/782,905

(22) PCT Filed: Dec. 7, 2020

(86) PCT No.: PCT/CA2020/051685
§ 371 (c)(1),
(2) Date: Jun. 6, 2022

(87) PCT Pub. No.: WO2021/108928
PCT Pub. Date: Jun. 10, 2021

(65) Prior Publication Data
US 2023/0029975 A1 Feb. 2, 2023

Related U.S. Application Data

(60) Provisional application No. 62/944,544, filed on Dec. 6, 2019.

(51) Int. Cl.
| | |
|---|---|
| *B62D 55/116* | (2006.01) |
| *B62D 55/10* | (2006.01) |
| *B62D 55/30* | (2006.01) |
| *B62D 55/24* | (2006.01) |

(52) U.S. Cl.
CPC ............ *B62D 55/116* (2013.01); *B62D 55/10* (2013.01); *B62D 55/305* (2013.01); *B62D 55/244* (2013.01)

(58) Field of Classification Search
CPC .. B62D 55/0655; B62D 55/10; B62D 55/104; B62D 55/1086; B62D 55/112; B62D 55/116; B62D 55/30; B62D 55/305
See application file for complete search history.

(56) References Cited

U.S. PATENT DOCUMENTS

| | | | | |
|---|---|---|---|---|
| 4,681,177 | A * | 7/1987 | Zborowski | B62D 55/30 305/152 |
| 5,899,543 | A * | 5/1999 | Lykken | B62D 55/1086 180/9.54 |
| 6,712,549 | B2 * | 3/2004 | Roth | B62D 55/104 404/83 |
| 6,929,334 | B2 | 8/2005 | Verheye et al. | |
| 7,380,892 | B2 * | 6/2008 | Rosenboom | B62D 55/305 180/9.46 |
| 7,726,749 | B2 * | 6/2010 | Rosenboom | B62D 55/14 305/155 |
| 9,828,047 | B2 * | 11/2017 | Eavenson, Sr. | B62D 55/10 |

(Continued)

*Primary Examiner* — Jason R Bellinger
(74) *Attorney, Agent, or Firm* — Hahn Loeser & Parks LLP

(57) ABSTRACT

A track system for traction of a vehicle (e.g., an agricultural vehicle) in which the track system is designed to better perform when the vehicle is roading, travelling on a side hill or other inclined surface, is braking or undergoing other rim pull events, and/or in other situations, such as by enhancing load distribution (e.g., with wheels that can laterally oscillate and be wider) and/or track tensioning (e.g., with different tensioning stages).

20 Claims, 26 Drawing Sheets

(56) References Cited

U.S. PATENT DOCUMENTS

| | | | |
|---|---|---|---|
| 10,308,296 B2* | 6/2019 | Piens | B62D 55/15 |
| 2017/0036714 A1 | 2/2017 | Lunkenbein | |
| 2018/0079275 A1* | 3/2018 | Sawai | B60G 17/08 |
| 2021/0221451 A1* | 7/2021 | Calcagni | B62D 55/10 |

* cited by examiner

TRACK SYSTEM FOR TRACTION OF A VEHICLE

CROSS-REFERENCE TO RELATED APPLICATIONS

This application is a National Phase Entry of international PCT patent application no. PCT/CA2020/051685 filed on Dec. 7, 2020, which claims the benefit of U.S. Provisional Patent Application No. 62/944,544 filed Dec. 6, 2019. The contents of the above-noted applications are incorporated by reference herein.

FIELD

This disclosure relates generally to vehicles (e.g., agricultural vehicles or other industrial vehicles, etc.) and, more particularly, to track systems for traction of vehicles.

BACKGROUND

Off-road vehicles, including agricultural vehicles (e.g., tractors, harvesters, combines, etc.), construction vehicles (e.g., loaders, excavators, bulldozers, etc.), and forestry vehicles (e.g., feller-bunchers, knuckleboom loaders, etc.), military vehicles (e.g., combat engineering vehicles (CEVs), etc.), snowmobiles, and all-terrain vehicles (ATVs), may comprise track systems to enhance their traction and floatation on soft, slippery, and/or irregular grounds (e.g., soil, mud, etc.).

Loads in a vehicle's track systems can vary significantly depending on how and where the vehicle is used, and this can affect performance and durability of their tracks and/or wheels.

For example, in some cases, vehicles may travel and perform work on side hills or other inclined surfaces, which may induce additional loads in their track systems' tracks and/or wheels (e.g., due to contact between drive/guide lugs of the tracks and respective ones of the wheels).

Also, in addition to travelling off-road (e.g., in agricultural fields), off-road vehicles may also sometimes be "roading", i.e., travelling on roads (e.g., between different fields). When on a road, a vehicle's track systems are exposed to conditions that are completely different than those in a field or other area with a soft, slippery and/or irregular ground and can drastically affect their performance. Notably, the road's hard surface, which may be relatively hot, and a frequent desire of the vehicle's operator to move the vehicle faster on the road (e.g., to minimize non-productive time) may result in severe wear and deterioration of the vehicle's tracks, which may lead to their premature failure.

Furthermore, in response to braking or other rim pull events, a tensioner of a vehicle's track system may retract and release its track, which may increase risks of the track ratcheting over its drive sprocket, which may lead to loss of control and/or damage.

For these and other reasons, improvements for track systems of vehicles would be welcomed.

SUMMARY

According to various aspects, this disclosure relates to a track system for traction of a vehicle (e.g., an agricultural vehicle) in which the track system is designed to better perform when the vehicle is roading, travelling on a side hill or other inclined surface, is braking or undergoing other rim pull events, and/or in other situations, such as by enhancing load distribution (e.g., with wheels that can laterally oscillate and be wider) and/or track tensioning (e.g., with different tensioning stages).

For example, according to an aspect, this disclosure relates to a track system for a vehicle, the track system comprising: a track that is elastomeric and comprises a ground-engaging outer surface and an inner surface opposite to the ground-engaging outer surface; and a track-engaging assembly configured to drive and guide the track around the track-engaging assembly. The track-engaging assembly comprises a plurality of track-contacting wheels and is configured such that a given one of the track-contacting wheels is pivotable about a pivot axis transversal to and below an axis of rotation of the given one of the track-contacting wheels.

According to another aspect, this disclosure relates to a track system for a vehicle, the track system comprising: a track that is elastomeric and comprises a ground-engaging outer surface and an inner surface opposite to the ground-engaging outer surface; and a track-engaging assembly configured to drive and guide the track around the track-engaging assembly. The track-engaging assembly comprises a plurality of track-contacting wheels and a linkage mechanism that implements a virtual pivot axis transversal to an axis of rotation of a given one of the track-contacting wheels such that the given one of the track-contacting wheels is pivotable relative to the virtual pivot axis.

According to another aspect, this disclosure relates to a track system for a vehicle, the track system comprising: a track that is elastomeric and comprises a ground-engaging outer surface and an inner surface opposite to the ground-engaging outer surface; and a track-engaging assembly configured to drive and guide the track around the track-engaging assembly. The track-engaging assembly comprises a plurality of track-contacting wheels and is configured such that a given one of the track-contacting wheels is pivotable about a pivot axis transversal to an axis of rotation of the given one of the track-contacting wheels by at least +/−2° from a rest position of the given one of the track-contacting wheels.

According to another aspect, this disclosure relates to a track system for a vehicle, the track system comprising: a track that is elastomeric and comprises a ground-engaging outer surface, an inner surface opposite to the ground-engaging outer surface, and a plurality of drive/guide projections projecting from the inner surface; and a track-engaging assembly configured to drive and guide the track around the track-engaging assembly. The track-engaging assembly comprises a plurality of track-contacting wheels and is configured such that a given one of the track-contacting wheels is pivotable about a pivot axis transversal to an axis of rotation of the given one of the track-contacting wheels. A given one of the drive/guide projections comprises a lateral surface facing the given one of the track-contacting wheels; and the given one of the track-contacting wheels occupies a majority of a distance between the lateral surface of the given one of the drive/guide projections and a lateral edge of the track in a widthwise direction of the track system.

According to another aspect, this disclosure relates to a track system for a vehicle, the track system comprising: a track that is elastomeric and comprises a ground-engaging outer surface, an inner surface opposite to the ground-engaging outer surface, and a plurality of drive/guide projections projecting from the inner surface; and a track-engaging assembly configured to drive and guide the track around the track-engaging assembly. The track-engaging assembly comprises a plurality of track-contacting wheels and is configured such that a given one of the track-contacting wheels is pivotable about a pivot axis transversal to an axis of rotation of the given one of the track-contacting wheels. A given one of the drive/guide projections comprises a lateral surface facing the given one of the track-contacting wheels. A distance between the lateral surface of the given one of the drive/guide projections and a lateral edge of the track in a widthwise direction of the track system is no more than 24 mm.

According to another aspect, this disclosure relates to a track system for a vehicle, the track system comprising: a track that is elastomeric and comprises a ground-engaging outer surface, an inner surface opposite to the ground-engaging outer surface, and a plurality of drive/guide projections projecting from the inner surface; and a track-engaging assembly configured to drive and guide the track around the track-engaging assembly. The track-engaging assembly comprises a plurality of track-contacting wheels and is configured such that a given one of the track-contacting wheels is pivotable about a pivot axis transversal to an axis of rotation of the given one of the track-contacting wheels. A given one of the drive/guide projections comprises a lateral surface facing the given one of the track-contacting wheels. A ratio of (i) a dimension of a gap between the given one of the track-contacting wheels and the lateral surface of the given one of the drive/guide projections in a widthwise direction of the track system in a rest position of the given one of the track-contacting wheels over (ii) a width of the given one of the track-contacting wheels in the widthwise direction of the track system is no more than 5%.

According to another aspect, this disclosure relates to a track system for a vehicle, the track system comprising: a track that is elastomeric and comprises a ground-engaging outer surface, an inner surface opposite to the ground-engaging outer surface, and a plurality of drive/guide projections projecting from the inner surface; and a track-engaging assembly configured to drive and guide the track around the track-engaging assembly. The track-engaging assembly comprises a plurality of track-contacting wheels and is configured such that a given one of the track-contacting wheels is pivotable about a pivot axis transversal to an axis of rotation of the given one of the track-contacting wheels. A given one of the drive/guide projections comprises a lateral surface facing the given one of the track-contacting wheels. A ratio of (i) a dimension of a gap between the given one of the track-contacting wheels and the lateral surface of the given one of the drive/guide projections in a widthwise direction of the track system in a rest position of the given one of the track-contacting wheels over (ii) a width of the track is no more than 3%.

According to another aspect, this disclosure relates to a track system for a vehicle, the track system comprising: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a tensioner configured to control a tension of the track and comprising a plurality of tensioning elements that are configured to control the tension of the track differently.

According to another aspect, this disclosure relates to a track system for a vehicle, the track system comprising: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a tensioner configured to control a tension of the track in a plurality of stages in which the tension of the track is controlled differently.

According to another aspect, this disclosure relates to a track system for a vehicle, the track system comprising: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a tensioner configured to control a tension of the track and comprising a plurality of bores that are dimensioned differently.

According to another aspect, this disclosure relates to a track system for a vehicle, the track system comprising: a track that is elastomeric and comprises a ground-engaging outer surface and an inner surface opposite to the ground-engaging outer surface; a track-engaging assembly configured to drive and guide the track around the track-engaging assembly and comprising a plurality of track-contacting wheels; and a tensioner configured to control a tension of the track and comprising a plural-stage hydraulic cylinder.

According to another aspect, this disclosure relates to a track system for a vehicle, the track system comprising: a track that is elastomeric and comprises a ground-engaging outer surface, an inner surface opposite to the ground-engaging outer surface, and a plurality of drive/guide projections projecting from the inner surface; and a track-engaging assembly configured to drive and guide the track around the track-engaging assembly, the track-engaging assembly comprising a plurality of track-contacting wheels and being configured such that a given one of the track-contacting wheels is pivotable about a pivot axis transversal to an axis of rotation of the given one of the track-contacting wheels. The plurality of track contacting wheels includes a plurality of roller wheels and a plurality of idler wheels. The given one of the track-contacting wheels is a given one of the roller wheels. A given one of the drive/guide projections comprises a lateral surface facing the given one of the track-contacting wheels. A ratio of (i) a dimension of a first gap between the given one of the track-contacting wheels and the lateral surface of the given one of the drive/guide projections in a widthwise direction of the track system in a rest position of the given one of the track-contacting wheels over (ii) a dimension of a second gap between a given one of the idler wheels and the lateral surface of the given one of the drive/guide projections in a widthwise direction of the track system in a rest position of the given one of the track-contacting wheels is no more than 4.

According to another aspect, this disclosure relates to a track system for a vehicle, the track system comprising: a track that is elastomeric and comprises a ground-engaging outer surface, an inner surface opposite to the ground-engaging outer surface, and a plurality of drive/guide projections projecting from the inner surface; and a track-engaging assembly configured to drive and guide the track around the track-engaging assembly, the track-engaging assembly comprising a plurality of track-contacting wheels and being configured such that a given one of the track-contacting wheels is pivotable about a pivot axis transversal to an axis of rotation of the given one of the track-contacting wheels. The plurality of track contacting wheels includes a plurality of roller wheels and a plurality of idler wheels. The given one of the track-contacting wheels is a given one of the roller wheels. A given one of the drive/guide projections comprises a lateral surface facing the given one of the track-contacting wheels. A difference between (i) a dimension of a first gap between the given one of the track-contacting wheels and the lateral surface of the given one of the drive/guide projections in a widthwise direction of the track system in a rest position of the given one of the track-contacting wheels, and (ii) a dimension of a second gap between a given one of the idler wheels and the lateral surface of the given one of the drive/guide projections in a widthwise direction of the track system in a rest position of the given one of the track-contacting wheels is no more than 18 mm.

According to another aspect, this disclosure relates to a track system for a vehicle, the track system comprising: a track that is elastomeric and comprises a ground-engaging outer surface, an inner surface opposite to the ground-engaging outer surface, and a plurality of drive/guide projections projecting from the inner surface; and a track-engaging assembly configured to drive and guide the track around the track-engaging assembly, the track-engaging assembly comprising a plurality of track-contacting wheels and being configured such that a given one of the track-contacting wheels is pivotable about a pivot axis transversal to an axis of rotation of the given one of the track-contacting wheels. The plurality of track contacting wheels includes a plurality of roller wheels and a plurality of idler wheels. The given one of the track-contacting wheels is a given one of the roller wheels. A given one of the drive/guide projections comprises a lateral surface facing the given one of the track-contacting wheels. A ratio of (i) a dimension of a portion of the given one of the drive/guide projections in a widthwise direction of the track system which can be rolled upon by a given one of the idler wheels when the vehicle travels on a laterally steep surface over (ii) a difference between (a) a dimension of a first gap between the given one of the track-contacting wheels and the lateral surface of the given one of the drive/guide projections in a widthwise direction of the track system in a rest position of the given one of the track-contacting wheels, and (b) a dimension of a second gap between the given one of the idler wheels and the lateral surface of the given one of the drive/guide projections in a widthwise direction of the track system in a rest position of the given one of the track-contacting wheels These and other aspects of this disclosure will now become apparent to those of ordinary skill in the art upon review of a description of embodiments in conjunction with accompanying drawings.

BRIEF DESCRIPTION OF DRAWINGS

A detailed description of embodiments is provided below, by way of example only, with reference to the accompanying drawings, in which.

It is to be expressly understood that the description and drawings are only for purposed of illustrating certain embodiments and are an aid for understanding. They are not intended to be and should not be limiting.

DETAILED DESCRIPTION OF EMBODIMENTS

Figure 1:
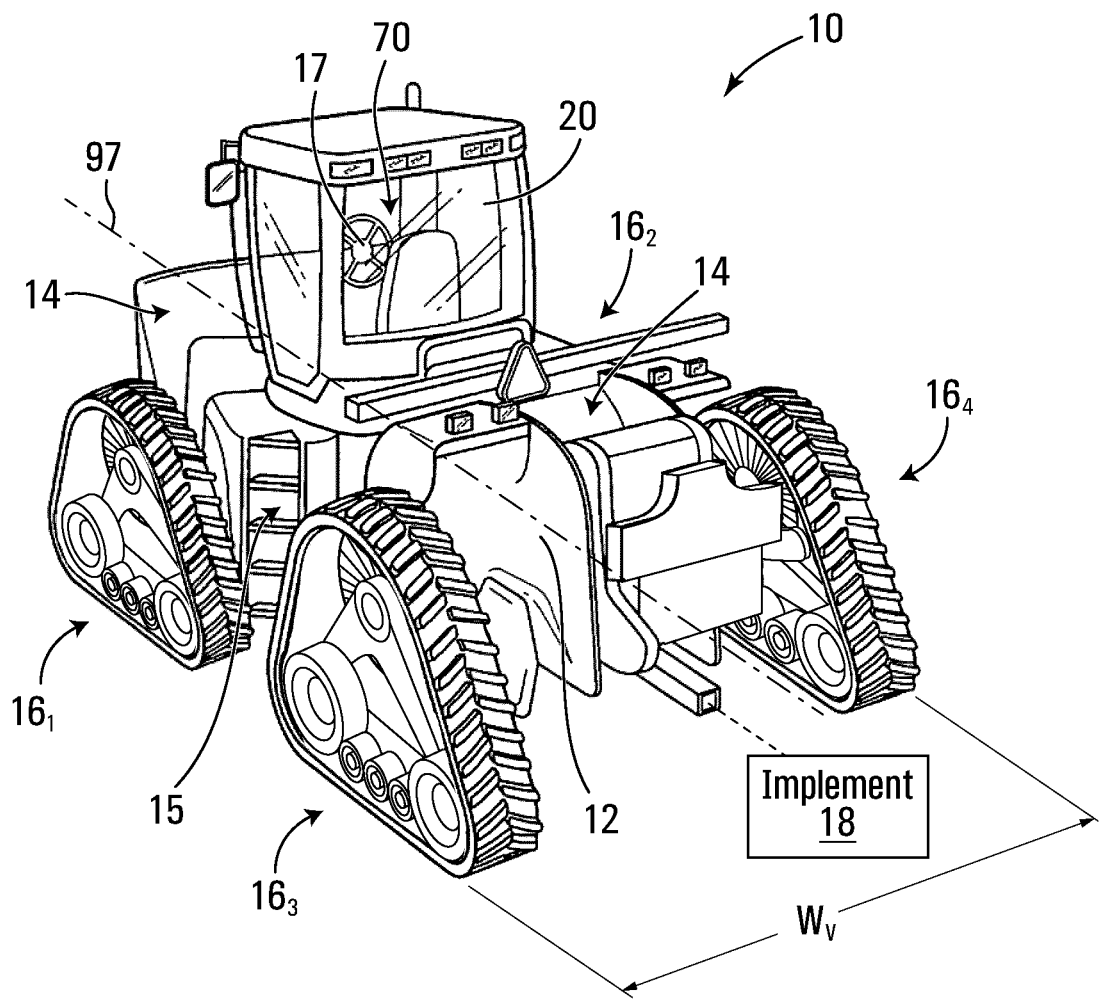
FIG. 1 shows an example of an agricultural vehicle comprising a track system in accordance with an embodiment.

FIG. 1 shows an example of an embodiment of a vehicle 10 comprising track systems $16_1$-$16_4$. In this embodiment, the vehicle 10 is a heavy-duty work vehicle for performing agricultural, construction or other industrial work, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a combine harvester, another type of harvester, a planter, or any other type of agricultural vehicle.

The agricultural vehicle 10 comprises a frame 12, a powertrain 15, a steering system 17, the track systems $16_1$-$16_4$ (which can be referred to as "undercarriages"), and an operator cabin 20 that enable an operator to move the agricultural vehicle 10 on the ground. The vehicle 10 can travel in an agricultural field to perform agricultural work using a work implement 18. The vehicle 10 can also be "roading", i.e., travelling on a road (i.e., a paved road having a hard surface of asphalt, concrete, gravel, or other pavement), such as between agricultural fields.

As further discussed later, in this embodiment, the track systems $16_1$-$16_4$ of the agricultural vehicle 10 are designed to better perform when the vehicle 10 is roading, travelling on a side hill or other inclined surface, is braking or undergoing other rim pull events, and/or in other situations, such as by enhancing load distribution (e.g., with wheels that can laterally oscillate and be wider) and/or track tensioning (e.g., with different tensioning stages).

The powertrain 15 is configured for generating motive power and transmitting motive power to the track systems $16_1$-$16_4$ to propel the agricultural vehicle 10 on the ground. To that end, the powertrain 15 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with the track systems $16_1$-$16_4$. That is, the powertrain 15 transmits motive power generated by the prime mover 14 to one or more of the track systems $16_1$-$16_4$ in order to drive (i.e., impart motion to) these one or more of the track systems $16_1$-$16_4$. The powertrain 15 may transmit power from the prime mover 14 to the track systems $16_1$-$16_4$ in any suitable way. In this embodiment, the powertrain 15 comprises a transmission between the prime mover 14 and one or more final drive axles 56 for transmitting motive power from the prime mover 14 to the track systems $16_1$-$16_4$. The transmission may be an automatic transmission (e.g., a continuously variable transmission (CVT)) or any other suitable type of transmission.

The work implement 18 is used to perform agricultural work. For example, in some embodiments, the work implement 18 may be a combine head, a cutter, a scraper pan, a tool bar, a planter, or any other type of agricultural work implement.

The operator cabin 20 is where the operator sits and controls the agricultural vehicle 10. More particularly, the operator cabin 20 comprises a user interface 70 including a set of controls that allow the operator to steer the agricultural vehicle 10 on the ground and operate the work implement 18. For example, in this embodiment, the user interface 70 comprises an accelerator, a brake control, and a steering device that are operable by the operator to control motion of the agricultural vehicle 10 on the ground and operation of the work implement 18. The user interface 70 also comprises an instrument panel (e.g., a dashboard) which provides indicators (e.g., a speedometer indicator, a tachometer indicator, etc.) to convey information to the operator.

Figure 2:
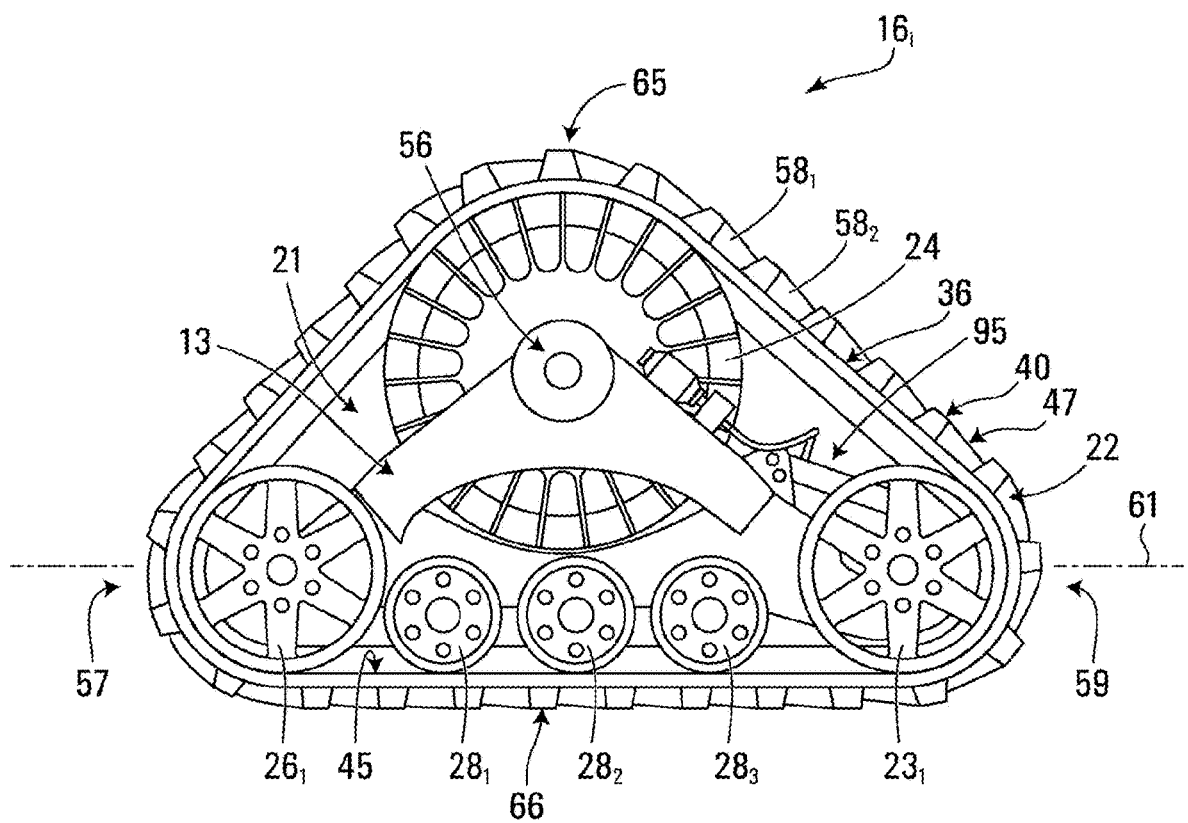
FIGS. 2 and 3 show a perspective view and a side view of the track system.
Figure 3:
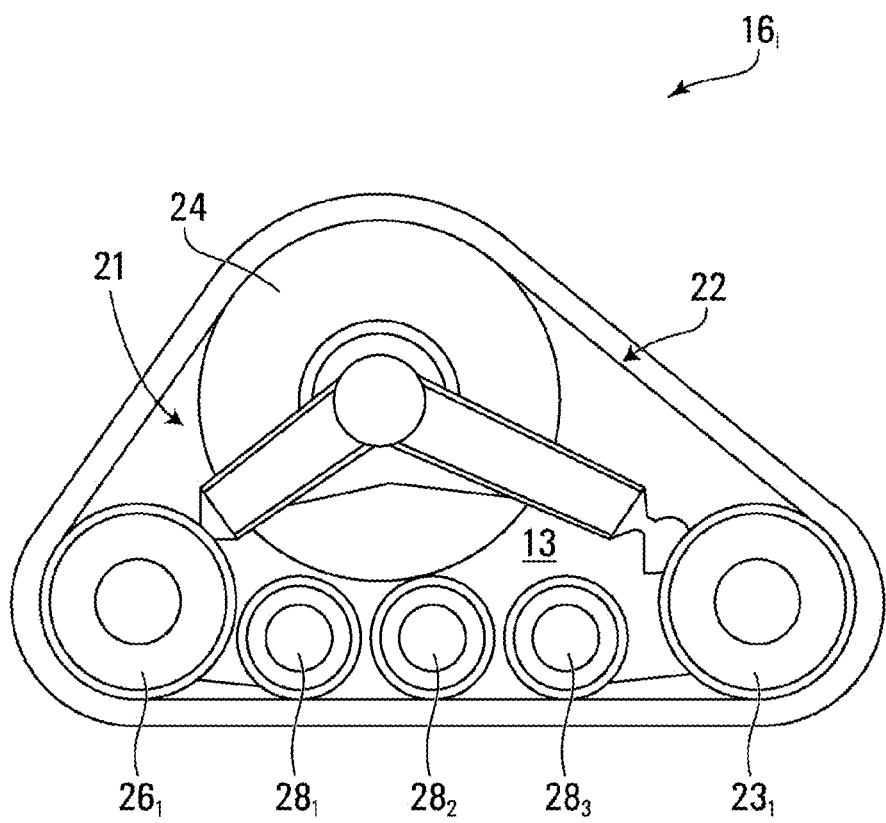
Figure 5:
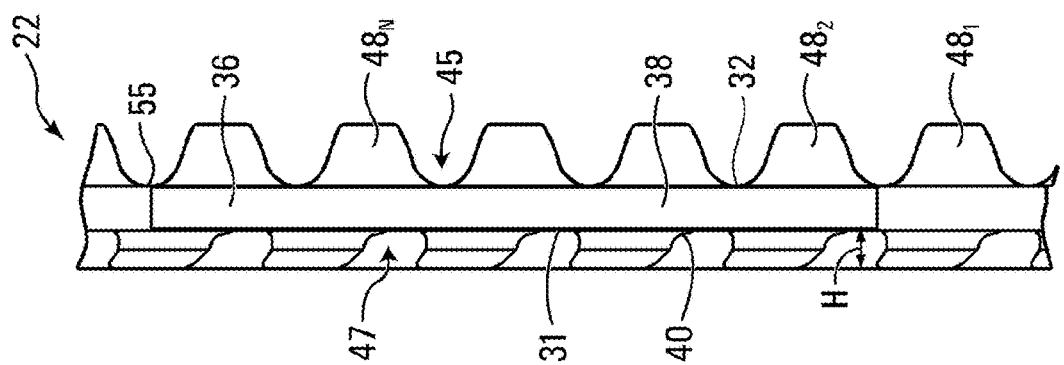
FIGS. 4 and 5 show a plan view and a side view of a track of the track system.
Figure 4:
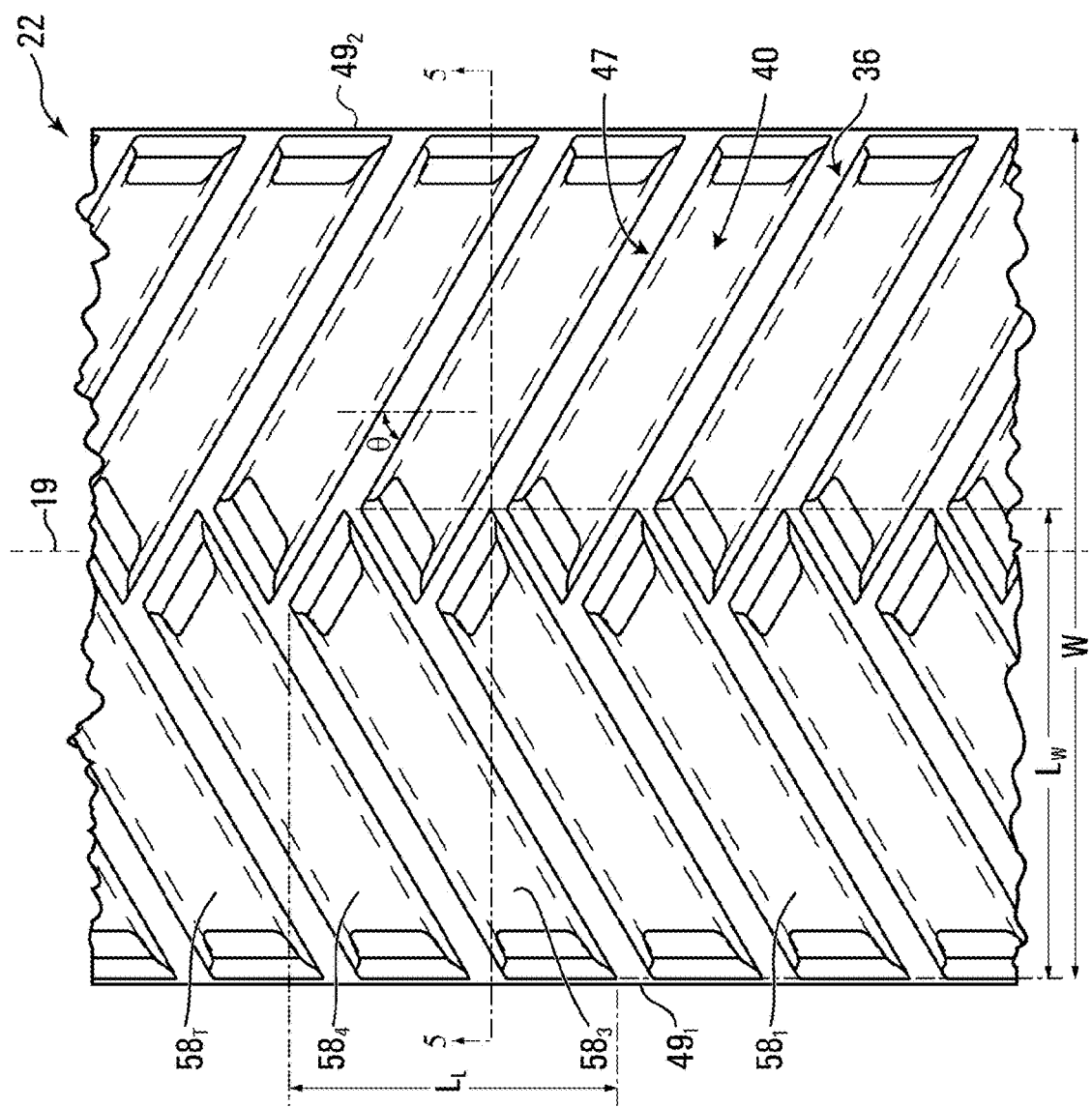
Figure 6:
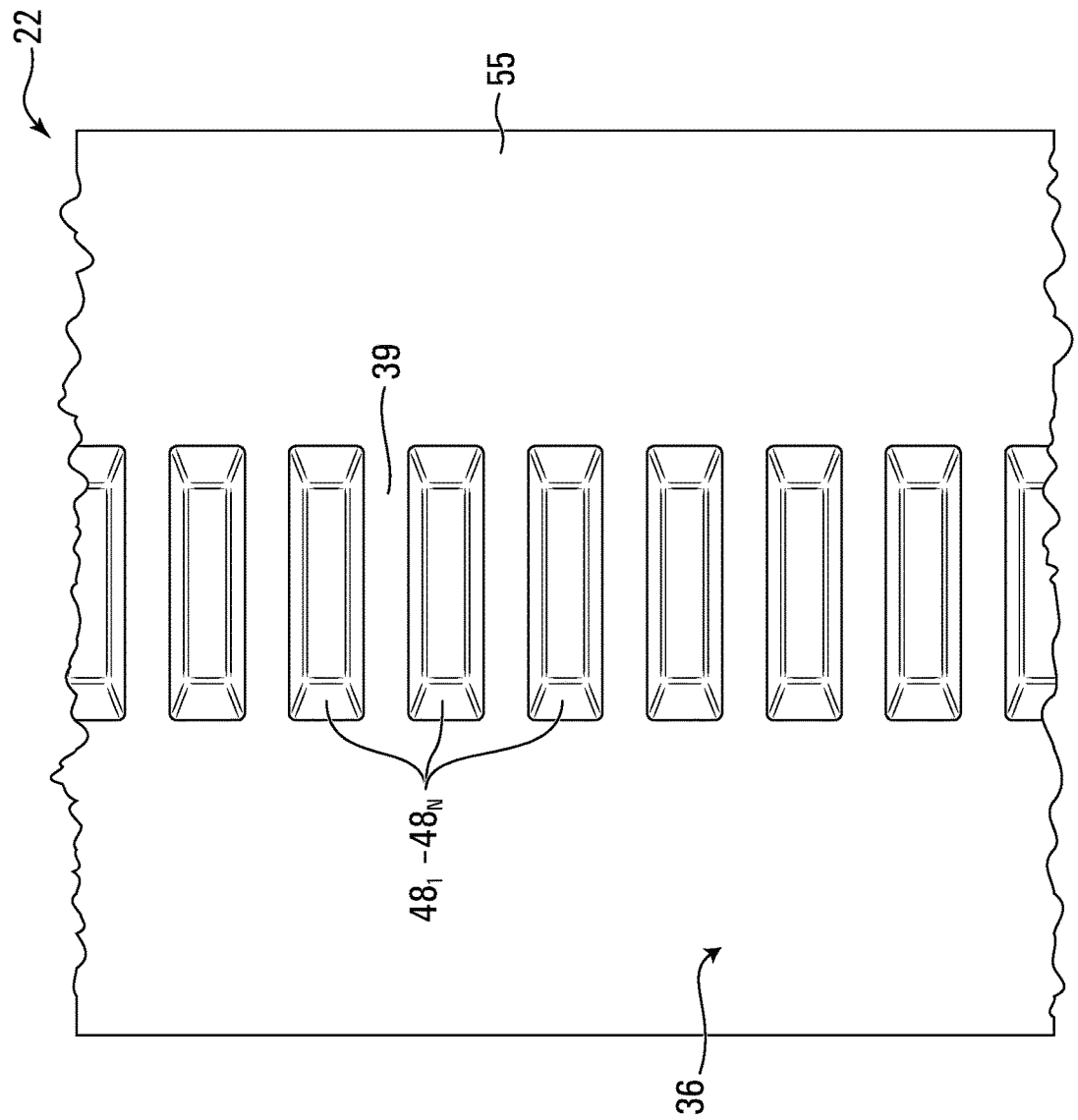
FIG. 6 shows an inside view of the track.
Figure 7:
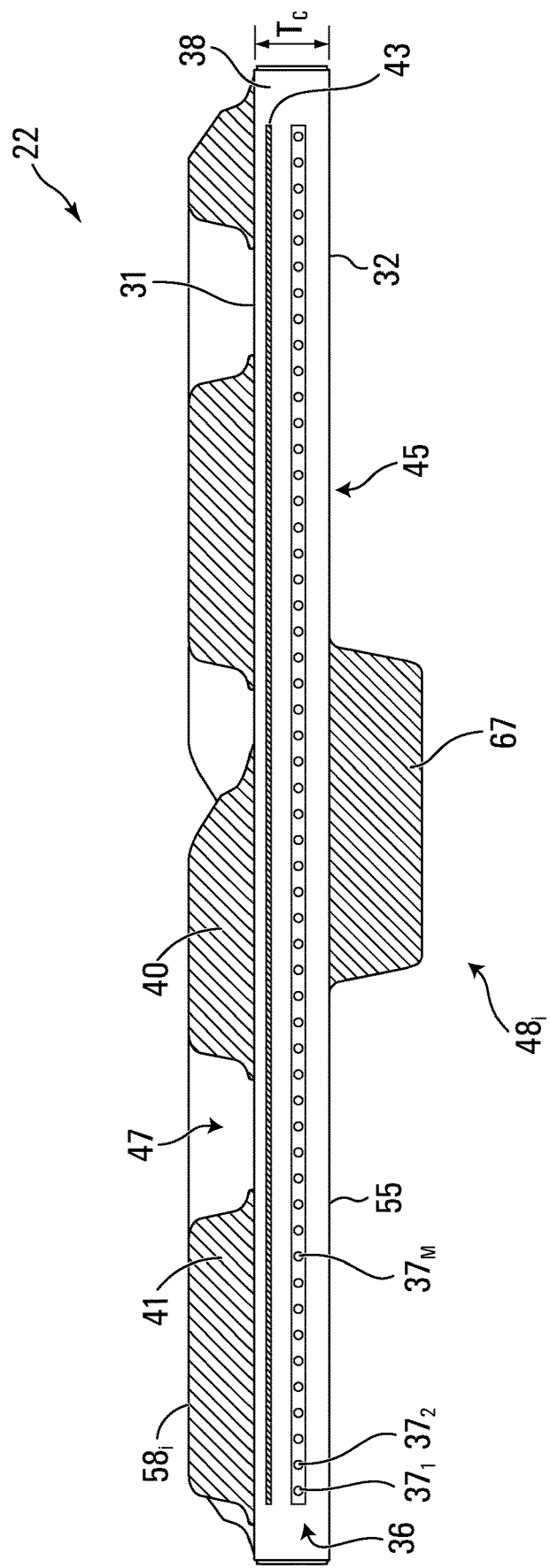
FIG. 7 shows a cross-sectional view of the track.

The track systems $16_1$-$16_4$ engage the ground to propel the agricultural vehicle 10. As shown in FIGS. 2 and 3, each track system $16_i$ comprises a track-engaging assembly 21 and a track 22 disposed around the track-engaging assembly 21. In this embodiment, the track-engaging assembly 21 comprises a plurality of track-contacting wheels which, in this example, includes a drive wheel 24 and a plurality of idler wheels that includes front (i.e., leading) idler wheels $23_1$, $23_2$, rear (i.e., trailing) idler wheels $26_1$, $26_2$, and roller wheels $28_1$-$28_6$ (shown in FIGS. 22A and 22B). The track system $16_i$ also comprises a frame 13 which supports various components of the track system $16_i$, including the wheels $23_1$, $23_2$, $26_1$, $26_2$, $28_1$-$28_6$. The track system $16_i$ has a longitudinal direction and a first longitudinal end 57 and a second longitudinal end 59 that define a length of the track system $16_i$ along a longitudinal axis 61 that defines the longitudinal direction of the track system $16_i$. The track system $16_i$ has a widthwise direction and a width that is defined by a width W of the track 22. The track system $16_i$ also has a heightwise direction that is normal to its longitudinal direction and its widthwise direction.

Each of the front ones of the track systems $16_1$-$16_4$ is steerable by the steering system 17 of the agricultural vehicle 10 in response to input of the user at the steering device to change an orientation of that track system relative to the frame 12 of the agricultural vehicle 10 in order to steer the agricultural vehicle 10 on the ground. To that end, each of the front ones of the track systems $16_1$-$16_4$ is pivotable about a steering axis of the agricultural vehicle 10. An orientation of the longitudinal axis 61 of each of the front ones of the track systems $16_1$-$16_4$ is thus adjustable relative to a longitudinal axis 97 of the agricultural vehicle 10.

The track 22 engages the ground to provide traction to the agricultural vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 4 to 7, the track 22 comprises an inner side 45, a ground-engaging outer side 47, and lateral edges $49_1$, $49_2$. The inner side 45 faces the wheels $23_1$, $23_2$, 24, $26_1$, $26_2$, $28_1$-$28_6$, while the ground-engaging outer side 47 engages the ground. Referring again to FIG. 2, a top run 65 of the track 22 extends between the longitudinal ends 57, 59 of the track system $16_i$ and over the wheels $23_1$, $23_2$, 24, $26_1$, $26_2$, $28_1$-$28_6$, while a bottom run 66 of the track 22 extends between the longitudinal ends 57, 59 of the track system $16_i$ and under the wheels $23_1$, $23_2$, 24, $26_1$, $26_2$, $28_1$-$28_6$. The bottom run 66 of the track 22 defines an area of contact of the track 22 with the ground which generates traction and bears a majority of a load on the track system $16_i$, and which will be referred to as a "contact patch" of the track 22 with the ground. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

In this embodiment, the track 22 is relatively narrow. For instance, this may be helpful to allow the track 22 to fit between rows of crops such as to leave the crops undisturbed when the agricultural vehicle 10 traverses an agricultural field. In turn, this may allow the agricultural field to have a greater crop density. For instance, in some embodiments, a ratio of a width $W_v$ of the agricultural vehicle 10 (measured between laterally-outwardmost ones of the track systems $16_1$-$16_4$) over the width W of the track 22 may be at least 5, in some cases at least 7, in some cases at least 10, in some cases at least 12, and in some cases even more. For example, in some embodiments, the width W of the track 22 may no more than 30 inches, in some cases no more than 25 inches, in some cases no more than 20 inches, in some cases no more than 18 inches, in some cases no more than 16 inches, and in some cases even less (e.g., 14.5 inches). The width W of the track 22 may have any other suitable value in other embodiments.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21.

In this embodiment, the carcass 36 comprises a plurality of reinforcements embedded in its elastomeric material 38. These reinforcements can take on various forms.

For example, in this embodiment, the carcass 36 comprises a layer of reinforcing cables $37_1$, $37_2$ that are adjacent to one another and extend generally in the longitudinal direction of the track 22 to enhance strength in tension of the track 22 along its longitudinal direction. In this case, each of the reinforcing cables $37_1$, $37_2$ is a cord including a plurality of strands (e.g., textile fibers or metallic wires). In other cases, each of the reinforcing cables $37_1$, $37_2$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_M$ and the layer of reinforcing fabric 43.

The inner side 45 of the endless track 22 comprises an inner surface 55 of the carcass 36 and a plurality of wheel-contacting projections $48_1$-$48_N$ that project from the inner surface 55 and are positioned to contact at least some of the wheels $23_1$, $23_2$, 24, $26_1$, $26_2$, $28_1$-$28_6$ to do at least one of driving (i.e., imparting motion to) the track 22 and guiding the track 22. The wheel-contacting projections $48_1$-$48_N$ can be referred to as "wheel-contacting lugs". Furthermore, since each of them is used to do at least one of driving the track 22 and guiding the track 22, the wheel-contacting lugs $48_1$-$48_N$ can be referred to as "drive/guide projections" or "drive/guide lugs". In some examples of implementation, a drive/guide lug $48_i$, for instance the drive/guide lug $48_2$, may interact with the drive wheel 24 to drive the track 22, in which case the drive/guide lug $48_i$ is a drive lug. In other examples of implementation, a drive/guide lug $48_i$ may interact with the front and rear idler wheels $23_1$, $23_2$, $26_1$, $26_2$ and/or the roller wheels $28_1$-$28_6$ to guide the track 22 to maintain proper track alignment and prevent de-tracking without being used to drive the track 22, in which case the drive/guide lug $48_i$ is a guide lug. In yet other examples of implementation, a drive/guide lug $48_i$ may both (i) interact with the drive wheel 24 to drive the track and (ii) interact with the idler wheels $23_1$, $23_2$, $26_1$, $26_2$ and/or the roller wheels $28_1$-$28_6$ to guide the track 22 to maintain proper track alignment and prevent de-tracking, in which case the drive/guide lug $48_i$ is both a drive lug and a guide lug.

In this embodiment, the drive/guide lugs $48_1$-$48_N$ interact with the drive wheel 24 in order to cause the track 22 to be driven, and also interact with the idler wheels $23_1$, $23_2$, $26_1$, $26_2$ and the roller wheels $28_1$-$28_6$ in order to guide the track 22 as it is driven by the drive wheel 24 to maintain proper track alignment and prevent de-tracking. The drive/guide lugs $48_1$-$48_N$ are thus used to both drive the track 22 and guide the track 22 in this embodiment.

In this example of implementation, the drive/guide lugs $48_1$-$48_N$ are arranged in a single row disposed longitudinally along the inner side 45 of the track 22. The drive/guide lugs $48_1$-$48_N$ may be arranged in other manners in other examples of implementation (e.g., in a plurality of rows that are spaced apart along the widthwise direction of the track 22).

Figure 8:
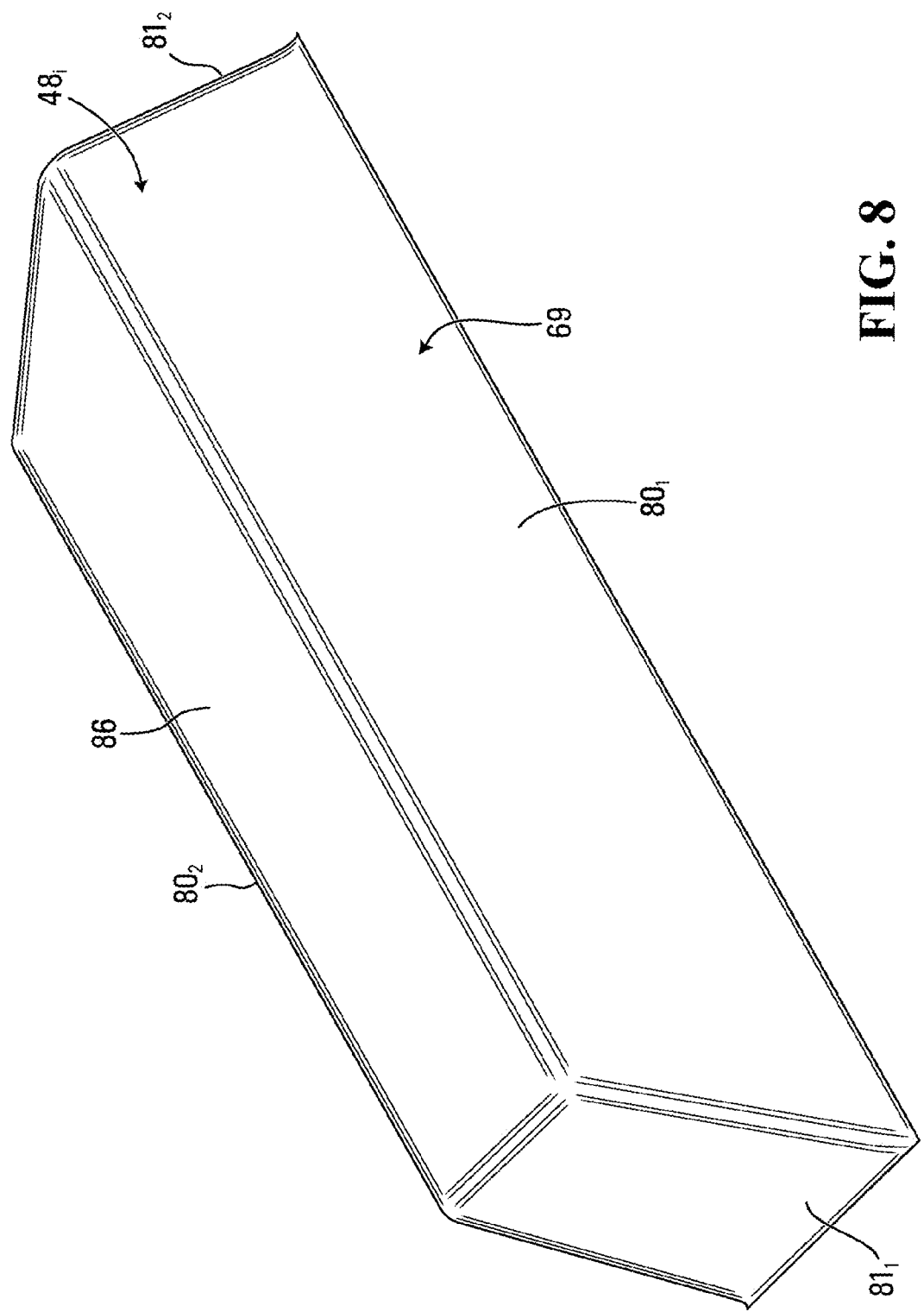
FIG. 8 shows a perspective view of a drive/guide projection of the track.

The drive/guide lugs $48_1$-$48_N$ may have any suitable shape. With additional reference to FIG. 8, each drive/guide lug $48_i$ has a periphery 69 which, in this embodiment, includes a front surface $80_1$, a rear surface $80_2$, two lateral surfaces $81_1$, $81_2$, and a top surface 86. The front surface $80_1$ and the rear surface $80_2$ are opposed to one another along the longitudinal direction of the track 22. In this embodiment where the drive/guide lug $48_i$ is used to drive the track 22, each of the front surface $80_1$ and the rear surface $80_2$ constitutes a drive surface which can be contacted by a drive member of the drive wheel 24 that pushes against it to impart motion to the track 22. The two lateral surfaces $81_1$, $81_2$ are laterally opposed and may contact the roller wheels $28_1$-$28_6$, the drive wheel 24 and/or the idler wheel 26 such as to prevent excessive lateral movement of the track 22 relative the wheels and to thus prevent de-tracking. Although it has a certain shape in this embodiment, the periphery 69 of the drive/guide lug $48_i$ may have various other shapes in other embodiments.

In this embodiment, the drive/guide lug $48_i$ is configured to pass between respective pairs of the idler wheels $23_1$, $23_2$, $26_1$, $26_2$ and/or the roller wheels $28_1$-$28_6$ when they are aligned with one another, such that the lateral surfaces $81_1$, $81_2$ of each drive/guide lug $48_i$ face respecting ones of the idler wheels $23_1$, $23_2$, $26_1$, $26_2$ and/or the roller wheels $28_1$-$28_6$ when they are aligned with one another.

In this embodiment, each drive/guide lug $48_i$ is an elastomeric drive/guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide lug $48_i$. In other embodiments, the elastomeric material 67 may include another elastomer in addition to or instead of rubber (e.g., polyurethane elastomer). The drive/guide lugs $48_1$-$48_N$ may be provided on the inner side 45 in various ways. For example, in this embodiment, the drive/guide lugs $48_1$-$48_N$ are provided on the inner side 45 by being molded with the carcass 36.

The ground-engaging outer side 47 comprises a ground-engaging outer surface 31 of the carcass 36 and a tread pattern 40 to enhance traction on the ground. The tread pattern 40 comprises a plurality of traction projections $58_1$-$58_T$ projecting from the ground-engaging outer surface 31, spaced apart in the longitudinal direction of the endless track 22 and engaging the ground to enhance traction. The traction projections $58_1$-$58_T$ may be referred to as "tread projections" or "traction lugs".

The traction lugs $58_1$-$58_T$ may have any suitable shape. In this embodiment, each of the traction lugs $58_1$-$58_T$ has an elongated shape and is angled, i.e., defines an oblique angle θ (i.e., an angle that is not a right angle or a multiple of a right angle), relative to the longitudinal direction of the track 22. The traction lugs $58_1$-$58_T$ may have various other shapes in other examples (e.g., curved shapes, shapes with straight parts and curved parts, etc.).

In this embodiment, each traction lug $58_i$, including for instance the traction lugs $58_3$, $58_4$, is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer). The traction lugs $58_1$-$58_T$ may be provided on the ground-engaging outer side 47 in various ways. For example, in this embodiment, the traction lugs $58_1$-$58_T$ are provided on the ground-engaging outer side 47 by being molded with the carcass 36.

Referring again to FIG. 4, each traction lug $58_i$ has a front-to-rear dimension $L_L$ in the longitudinal direction of the endless track 22 and a side-to-side dimension $L_W$ in the widthwise direction of the endless track 22. In some cases, the front-to-rear dimension $L_L$ may be a width of the traction lug $58_i$ while the side-to-side dimension $L_W$ may be a length of the traction lug $58_i$. In other cases, the front-to-rear dimension Ly may be a length of the traction lug $58_i$ while the side-to-side dimension $L_W$ may be a width of the traction lug $58_i$. In yet other cases, the front-to-rear dimension $L_L$ and the side-to-side dimension $L_W$ may be substantially the same. The traction lug $58_i$ also has a height H (shown in FIG. 5).

The track 22 may be constructed in various other manners in other embodiments. For example, in some embodiments, the track 22 may have recesses or holes that interact with the drive wheel 24 in order to cause the track 22 to be driven (e.g., in which case the drive/guide lugs $48_1$-$48_N$ may be used only to guide the track 22 without being used to drive the track 22, i.e., they may be "guide lugs" only), and/or the ground-engaging outer side 47 of the track 22 may comprise various patterns of traction lugs.

The drive wheel 24 is rotatable by power derived from the prime mover 14 to drive the track 22. That is, power generated by the prime mover 14 and delivered over the powertrain 15 of the agricultural vehicle 10 can rotate the final drive axle 56, which causes rotation of the drive wheel 24, which in turn imparts motion to the track 22.

Figure 9:
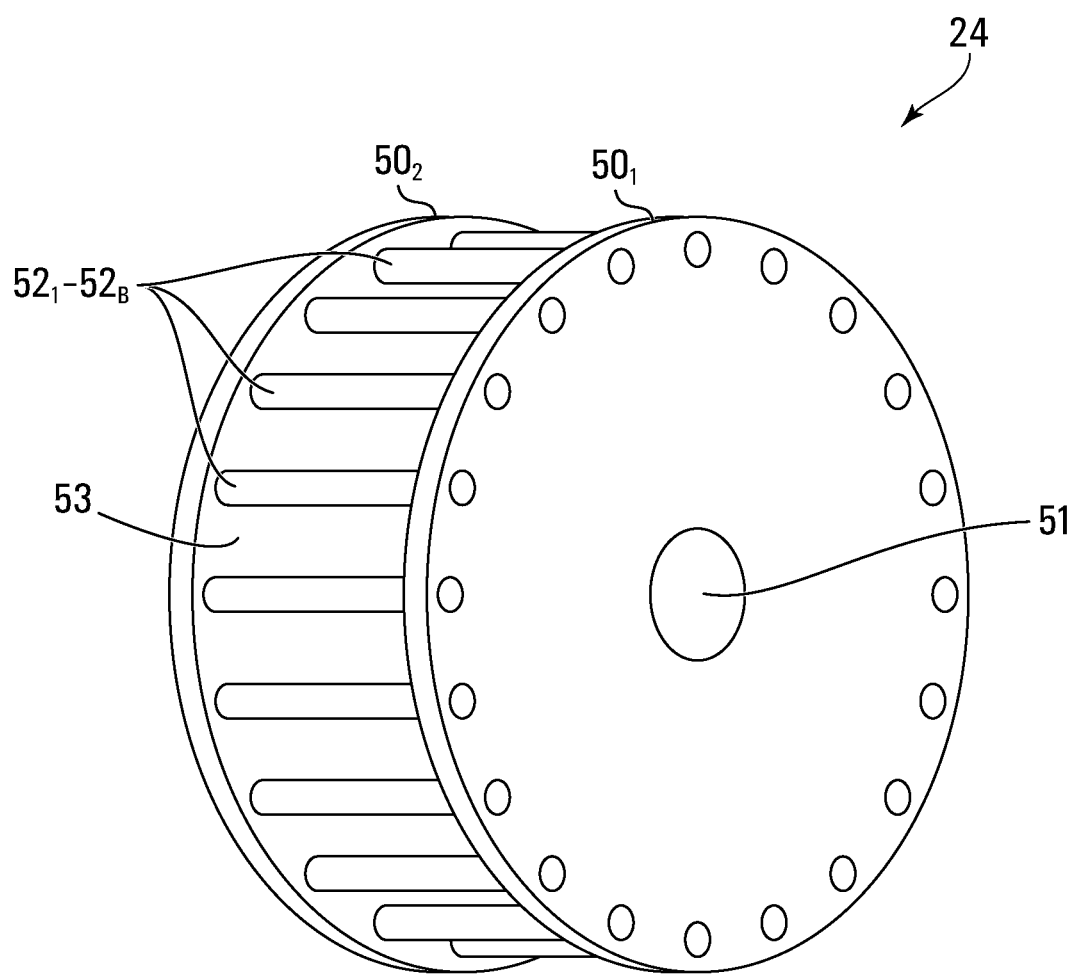
FIG. 9 shows a drive wheel of a track-engaging assembly of the track system.

With additional reference to FIG. 9, in this embodiment, the drive wheel 24 comprises a drive sprocket comprising a plurality of drive members $52_1$-$52_B$ spaced apart along a circular path to engage the drive/guide lugs $48_1$-$48_N$ of the track 22 in order to drive the track 22. The drive wheel 24 and the track 22 thus implement a "positive drive" arrangement. More particularly, in this embodiment, the drive wheel 24 comprises two side discs $50_1$, $50_2$ which are co-centric and turn about a common axle 51 and between which the drive members $52_1$-$52_B$ extend near respective peripheries of the side discs $50_1$, $50_2$. In this example, the drive members $52_1$-$52_B$ are thus drive bars that extend between the side discs $50_1$, $50_2$. The drive wheel 24 and the track 22 have respective dimensions allowing interlocking of the drive bars $52_1$-$52_B$ of the drive wheel 24 and the drive/guide lugs $48_1$-$48_N$ of the track 22. Adjacent ones of the drive bars $52_1$-$52_B$ define an interior space 53 between them to receive one of the drive/guide lugs $48_1$-$48_N$. Adjacent ones of the drive/guide lugs $48_1$-$48_N$ define an inter-lug space 39 between them to receive one of the drive bars $52_1$-$52_B$. The drive/guide lugs $48_1$-$48_N$ and the drive bars $52_1$-$52_B$ have a regular spacing that allows interlocking of the drive/guide lugs $48_1$-$48_N$ and the drive bars $52_1$-$52_B$ over a certain length of the drive wheel's circumference.

The drive wheel 24 may be configured in various other ways in other embodiments. For example, in other embodiments, the drive wheel 24 may not have any side discs such as the side discs $50_1$, $50_2$. As another example, in other embodiments, instead of being drive bars, the drive members $52_1$-$52_B$ may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" arrangement).

Figure 10:
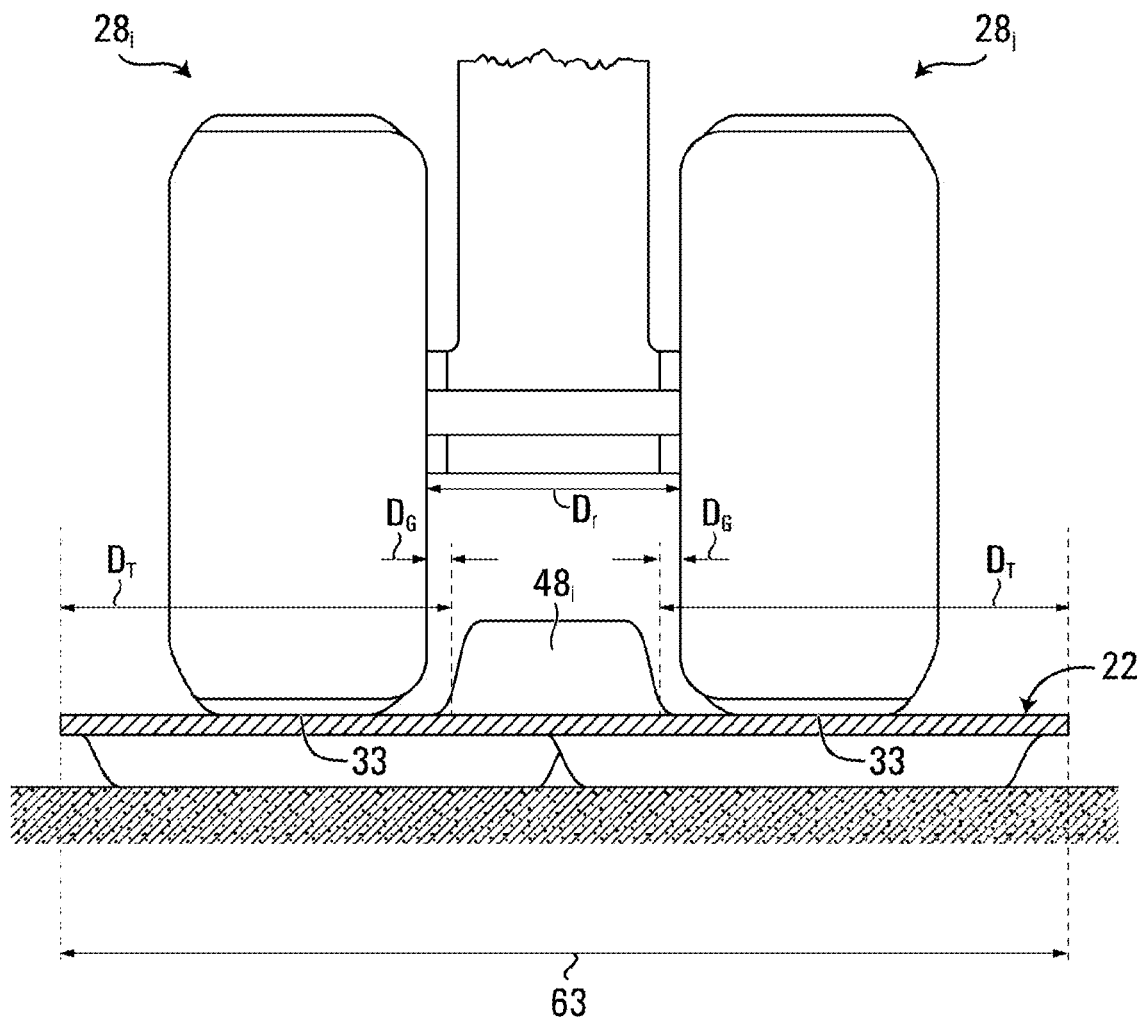
FIG. 10 shows mid-rollers of the track-engaging assembly engaging an inner side the track.
Figure 11:
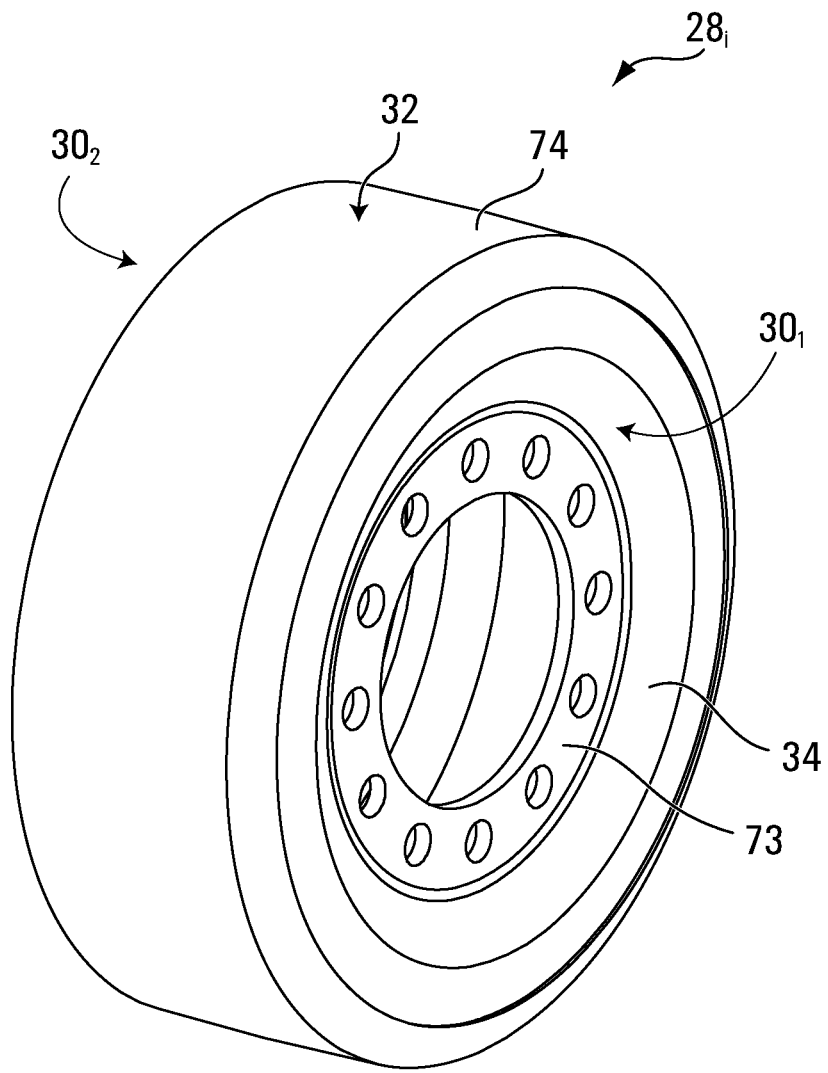
FIGS. 11 and 12 show perspective views of a mid-roller of the track-engaging assembly.
Figure 12:
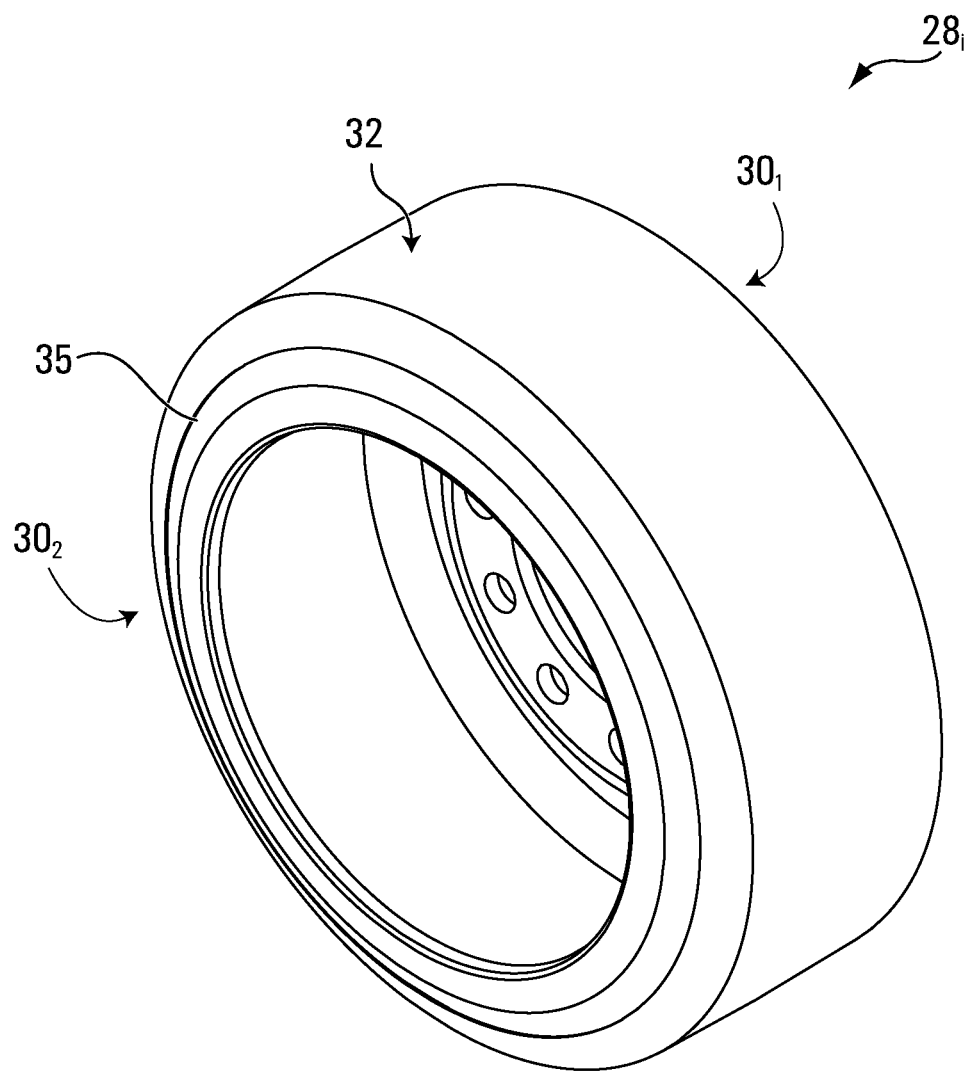
Figure 13:
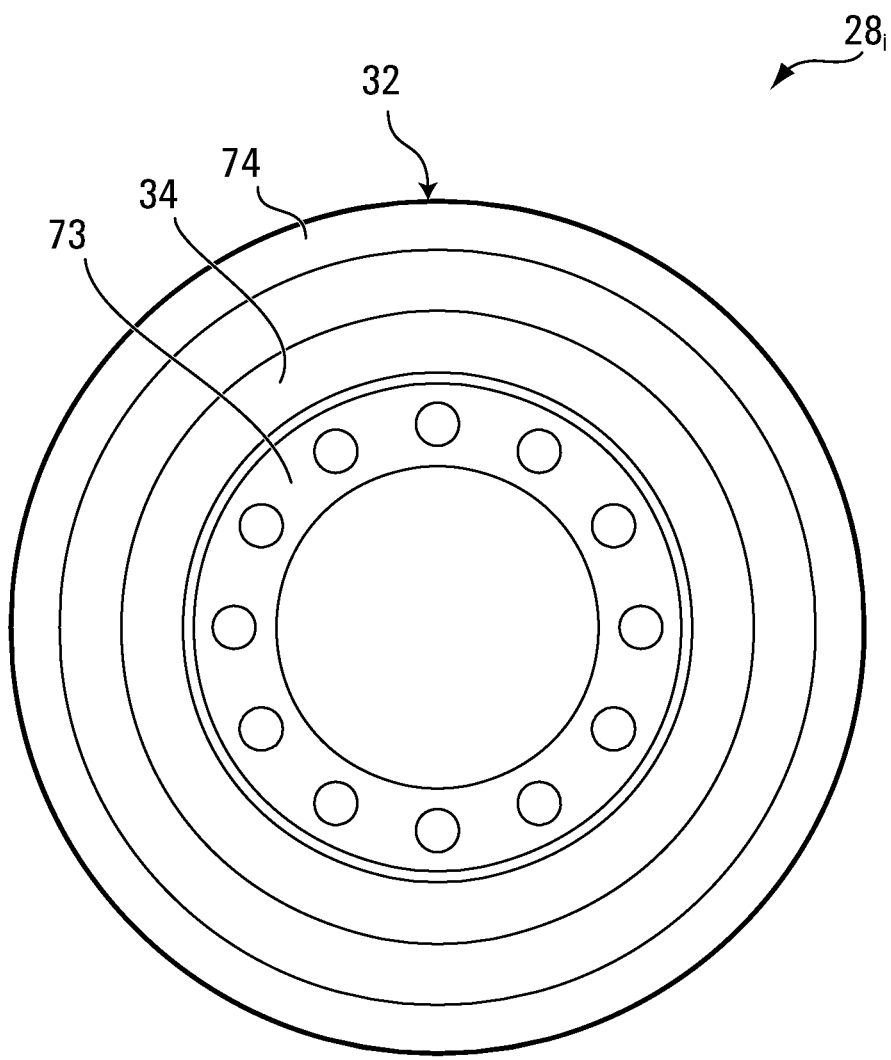
FIGS. 13 and 14 show a front view and a side view of the mid-roller.
Figure 14:
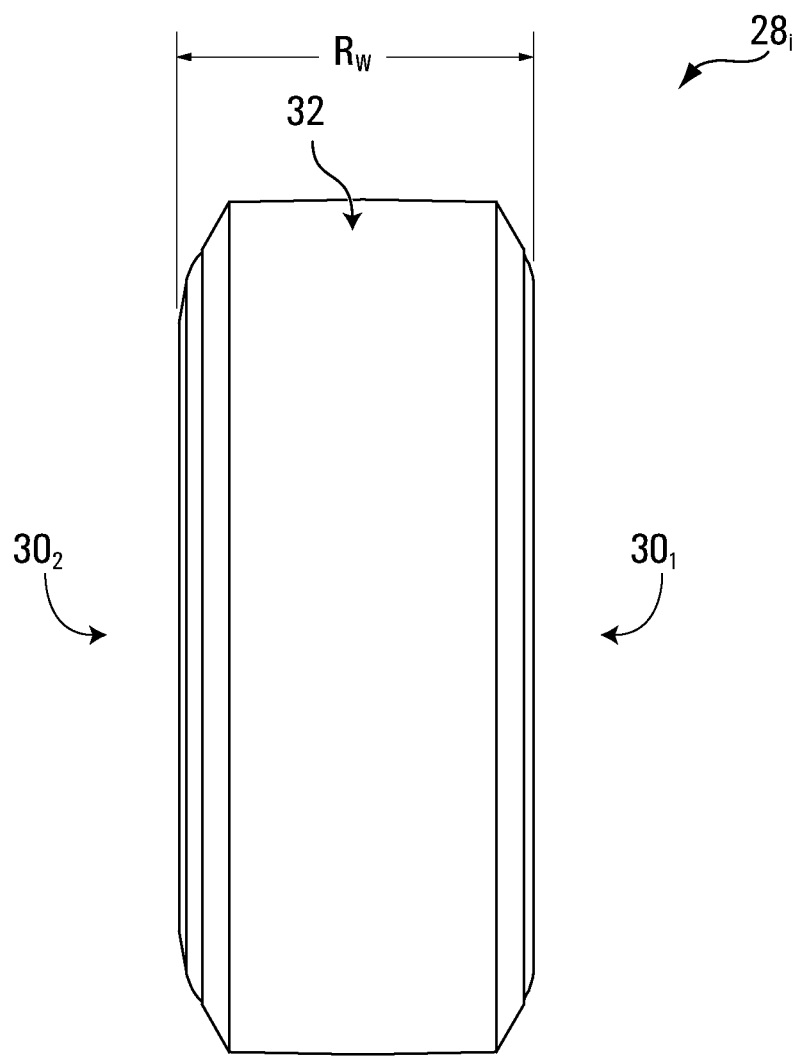

The front idler, rear idler, and roller wheels $23_1$, $23_2$, $26_1$, $26_2$, $28_1$-$28_6$ are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22. More particularly, in this embodiment, the front and rear idler wheels $23_1$, $23_2$, $26_1$, $26_2$ maintain the track 22 in tension and help to support part of the weight of the agricultural vehicle 10 on the ground via the track 22. As shown in FIG. 10, the roller wheels $28_i$, $28_j$ roll on a rolling path 33 of the inner side 45 of the track 22 along the bottom run 66 of the track 22 to apply the bottom run 66 on the ground. In this case, as they are located between frontmost and rearmost ones of the wheels of the track system $16_i$, the roller wheels $28_1$-$28_6$ can be referred to as "mid-rollers".

With additional reference to FIGS. 11 to 14, each mid-roller $28_i$ comprises a hub portion 73, a rim portion 74, and a radially-extending portion 34 between the hub portion 73 and the rim portion 74. The hub portion 73 is an inner portion of the mid-roller 28; which is associated with a hub receiving an axle for the mid-roller $28_i$. The rim portion 74 is an outer portion of the mid-roller 28; which contacts the inner side 45 of the endless track 22. The radially-extending portion 34 is an intermediate portion of the mid-roller 28; which extends radially between the hub portion 73 and the rim portion 74.

The mid-roller $28_i$ comprises a pair of lateral sides $30_1$, $30_2$ opposite one another and a peripheral side 32 between the lateral sides $30_1$, $30_2$. The peripheral side 32 rolls on the inner side 45 of the track 22 to apply the bottom run 66 of track 22 on the ground. More particularly, in this embodiment, the mid-roller $28_i$ rolls on the rolling path 33 which is delimited by some of the drive/guide lugs $48_1$-$48_N$ such that, as the mid-roller $28_i$ rolls, these drive/guide lugs pass next to the mid-roller $28_i$.

In this embodiment, the mid-roller $28_i$ may engage a significant extent of the width W of the track 22. For example, in some embodiments, a ratio of a width $R_W$ of the mid-roller $28_i$ over the width W of the track 22 may be at least 0.2, in some cases at least 0.3, in some cases at least 0.4, and in some cases even more.

Figure 15:
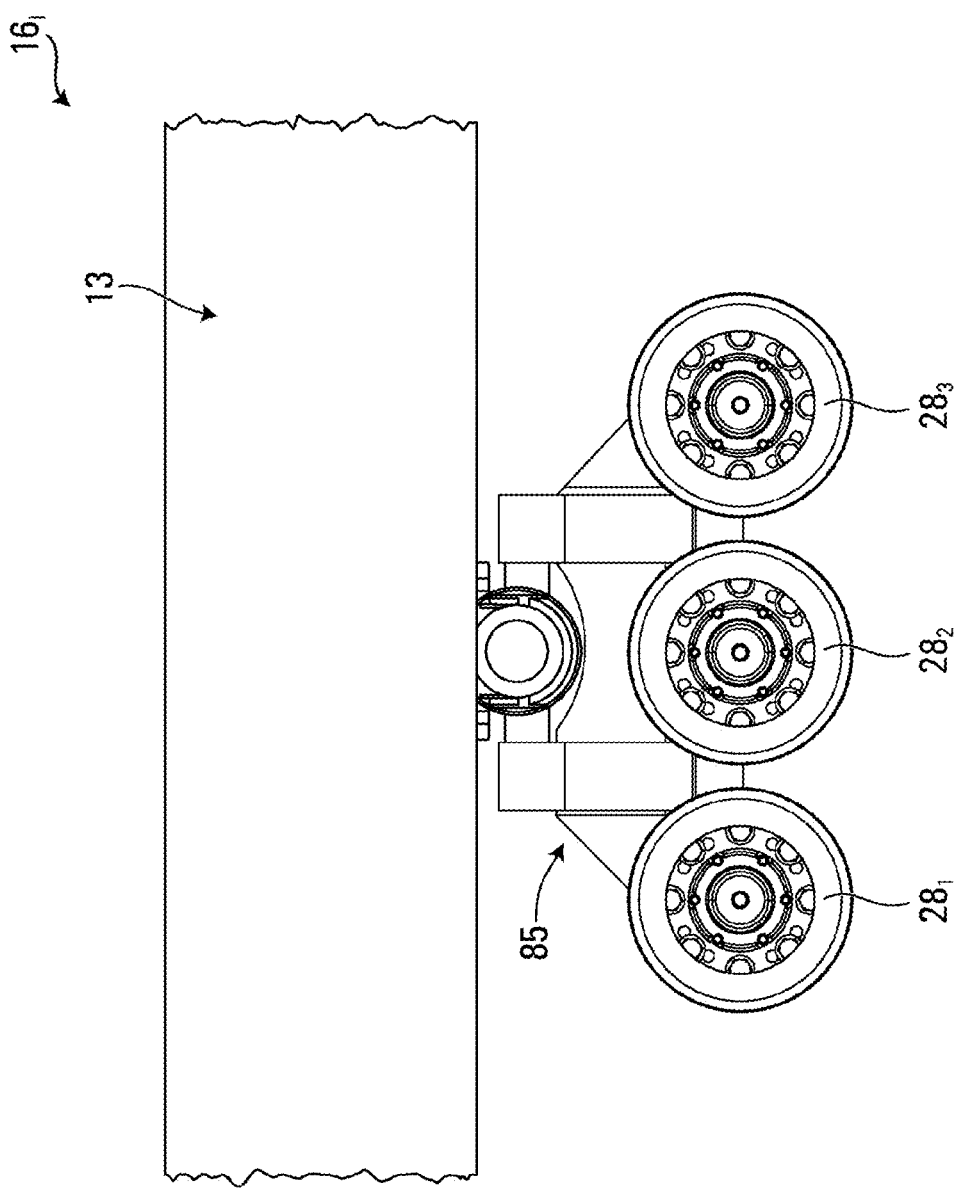
FIG. 15 shows a partial cross-sectional side view of a lower portion of the track system, including a bogie carrying the mid-rollers.
Figure 16:
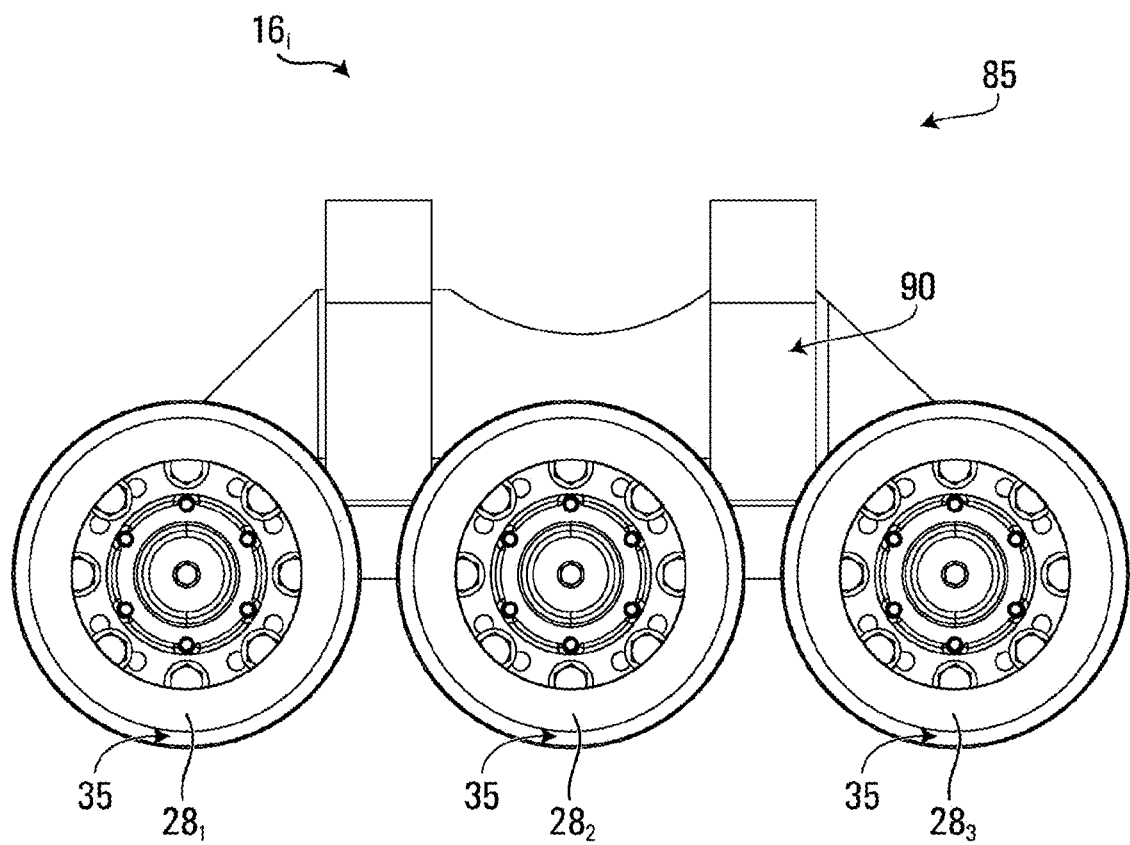
FIGS. 16 and 17 show a side view and a perspective view of the bogie.
Figure 17:
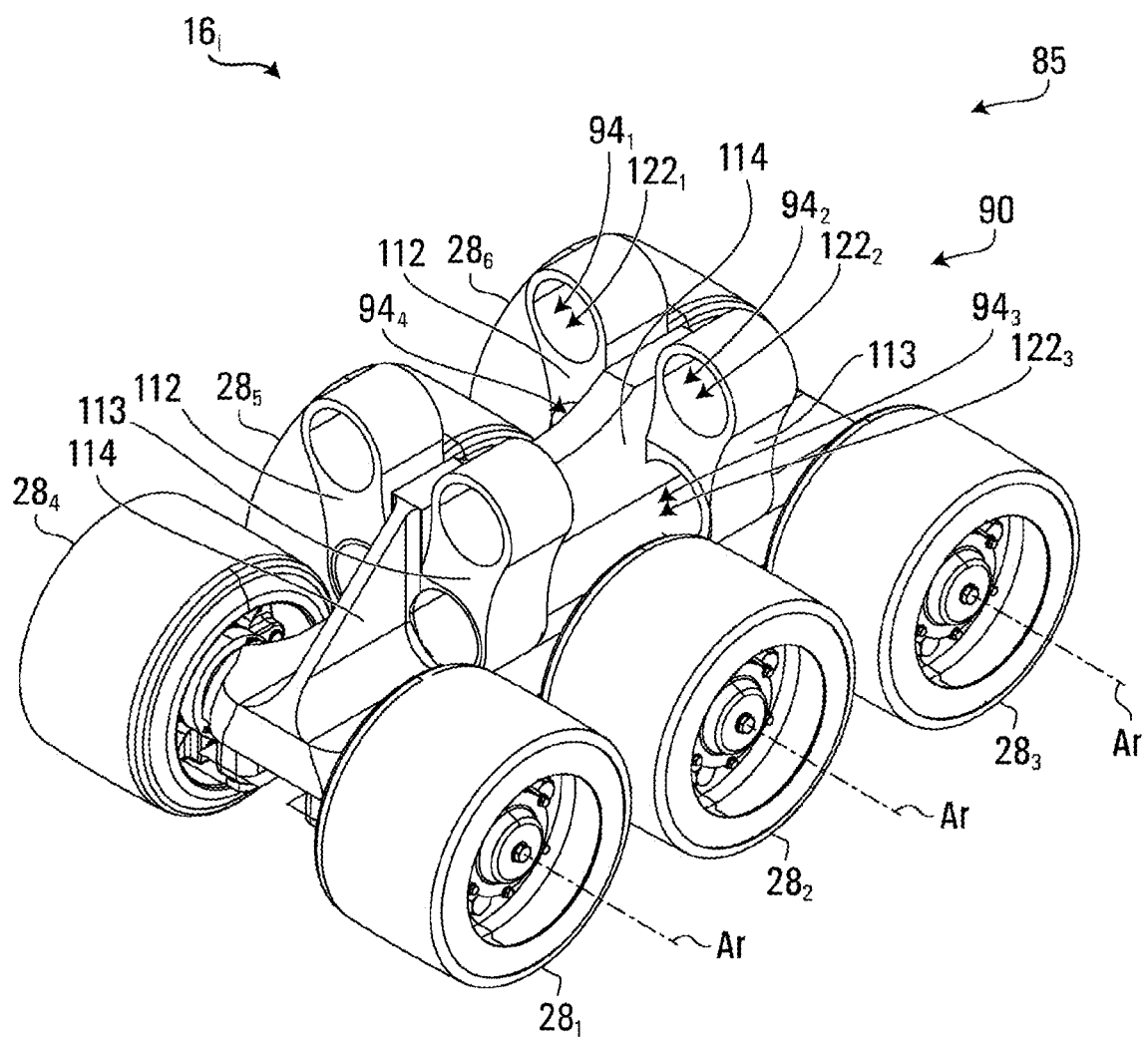
Figure 18:
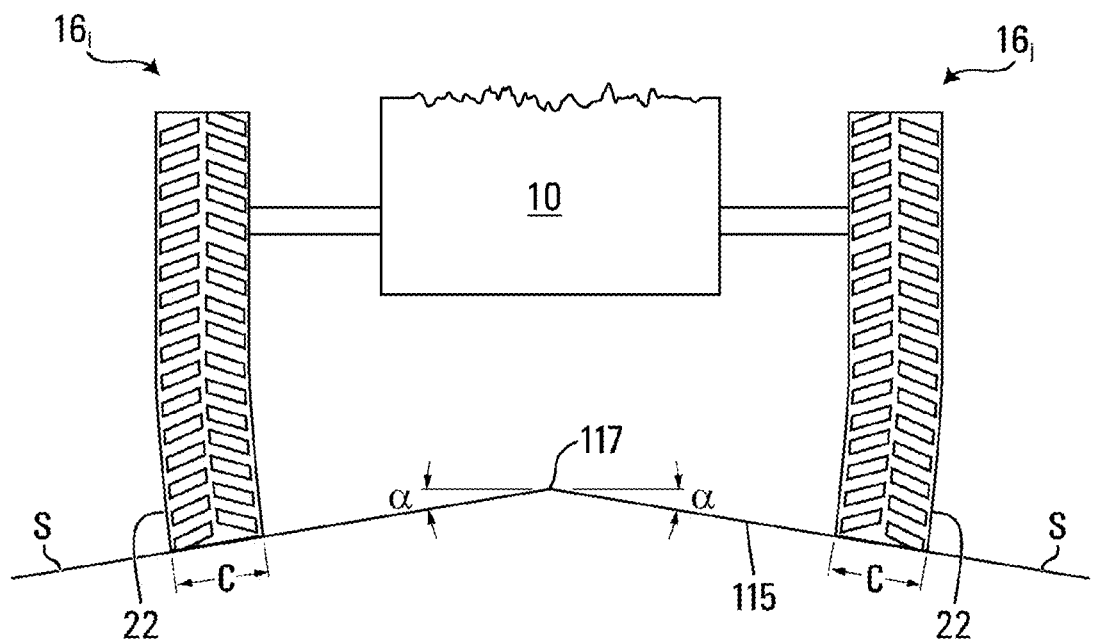
FIG. 18 shows a front view of the agricultural vehicle travelling on a crowned road.
Figure 19:
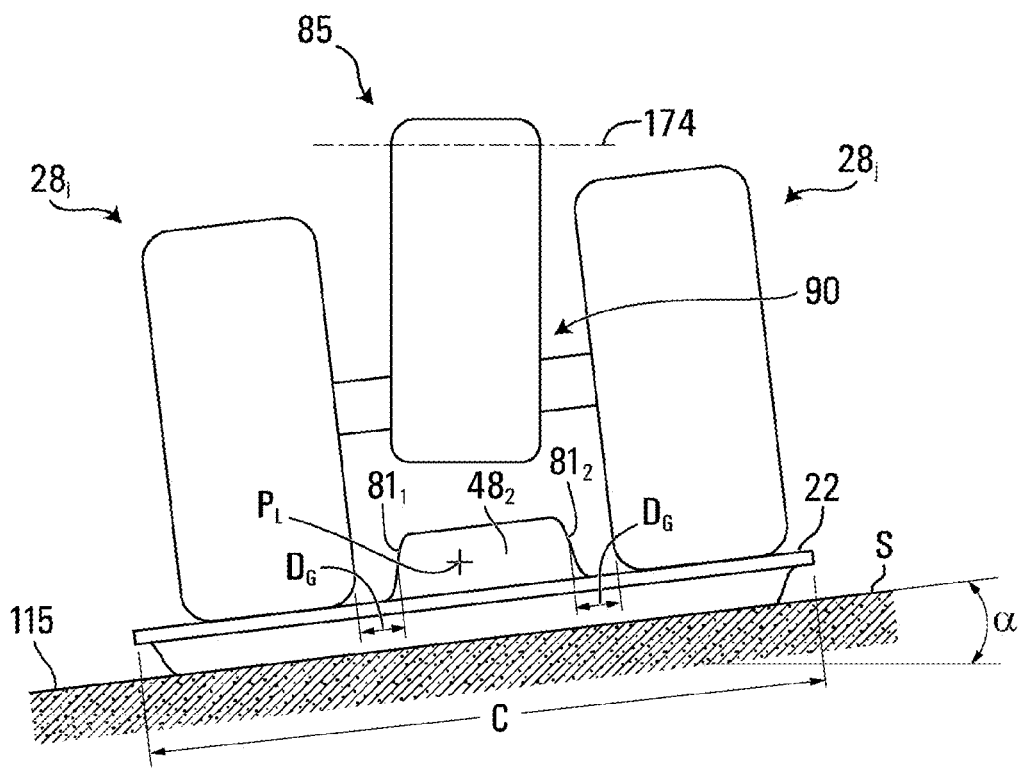
FIG. 19 shows a cross-sectional view of the bogie, the track and the crowned road while the agricultural vehicle is over the crowned road.

In addition, in this embodiment, as shown in FIGS. 15 to 17, the track system 16$_i$ comprises a bogie 85 which is a wheel-carrying subassembly configured to carry and support the mid-rollers 28$_1$-28$_6$ and mounted to the frame 13 of the track system 16$_i$. The mid-rollers 28$_1$-28$_6$ may not be mounted to a bogie in other embodiments. For example, the mid-rollers 28$_1$-28$_6$ may be mounted directly to the frame 13 of the track system 16$_i$ in other embodiments.

Moreover, as shown in FIG. 2, the track system 16$_i$ may comprise a tensioner 95 configured to control a tension of the track 22. For instance, in this embodiment, the tensioner 95 comprises an actuator mounted at one end to the frame 13 of the track system 16$_i$ and at another end to a hub of the front idler wheels 23$_1$, 23$_2$. This allows the tensioner 95 to modify a distance between the front idler wheels 23$_1$, 23$_2$ and the rear idler wheels 26$_1$, 26$_2$ in the longitudinal direction of the track system 16$_i$, thereby affecting the tension of the track 22.

With additional reference to FIGS. 20A to 21B, in this embodiment, the track-engaging assembly 21 of the track system 16$_i$, including its bogie 85, is configured such that given ones of the roller wheels 28$_1$-28$_6$ are pivotable about a pivot axis P$_L$ transverse to axes of rotation A$_R$ of the given ones of the roller wheels 28$_1$-28$_6$ when the track system 16$_i$ moves on an uneven ground area. More particularly, in this embodiment, the pivot axis P$_L$ is substantially parallel to the longitudinal direction of the track system 16$_i$, such that the given ones of the roller wheels 28$_1$-28$_6$ may be viewed as having a lateral oscillation or "roll" capability that allows them to laterally oscillate or "roll" relative to the pivot axis P$_L$.

For example, in some embodiments, this may be useful when the agricultural vehicle 10 is roading, i.e., travelling on a road 115, such as between agricultural fields, notably by reducing or minimizing deteriorative effects on its track 22 (e.g., "blowout" of the traction projections 58$_1$-58$_T$ of the track 22, deterioration of the carcass 36 of the track 22, etc.) as the vehicle 10 travels fast against a hard surface S (e.g., asphalt, concrete, gravel, or other pavement) of the road 115, thereby making the vehicle 10 more efficient and productive.

This capability of the track system 16$_i$ to better perform on the road 115 may be particularly useful in situations such as this example in which the road's surface S has a cross slope for leading water away from the road 115 (i.e., to avoid water accumulation on the road 115). In this case, the cross slope of the road's surface S is such that the road 115 has a crown 117, i.e., a highest point, at a center of the road 115 in its widthwise direction and slopes downwardly on either side of the crown 117. For instance, in some cases, an angle α defined between a horizontal axis and the road's surface S on either side of the crown 117 may be at least 1°, in some cases at least 2°, in some cases at least 4°, in some cases at least 6°, in some cases at least 8°, in some cases at least 10°, and in some cases even higher. The angle α may have any other value in other cases. In view of its crown 117, the road 115 may sometimes be referred to as a "crowned road".

In this embodiment, the track system 16$_i$ may be configured to accommodate a shape of the road 115, including its crown 117 in this example, so as to better distribute loading on its track 22 than a conventional track system and/avoid or limit premature wear of the mid-rollers 28$_1$-28$_6$ and the track.

As another example, in some embodiments, this may also be useful when the agricultural vehicle 10 is travelling on a side hill or other inclined surface of a field, road shoulder, or other place.

In this embodiment, laterally-adjacent ones of the mid-rollers 28$_1$-28$_6$ are mounted to pivot together about the pivot axis P$_L$. For instance, in this embodiment, the mid-rollers 28$_1$, 28$_6$ are mounted to pivot together about the pivot axis P$_L$, the mid-rollers 28$_2$, 28$_5$ are mounted to pivot together about the pivot axis P$_L$, and the mid-rollers 28$_3$, 28$_6$ are mounted to pivot together about the pivot axis P$_L$.

Figure 20A:
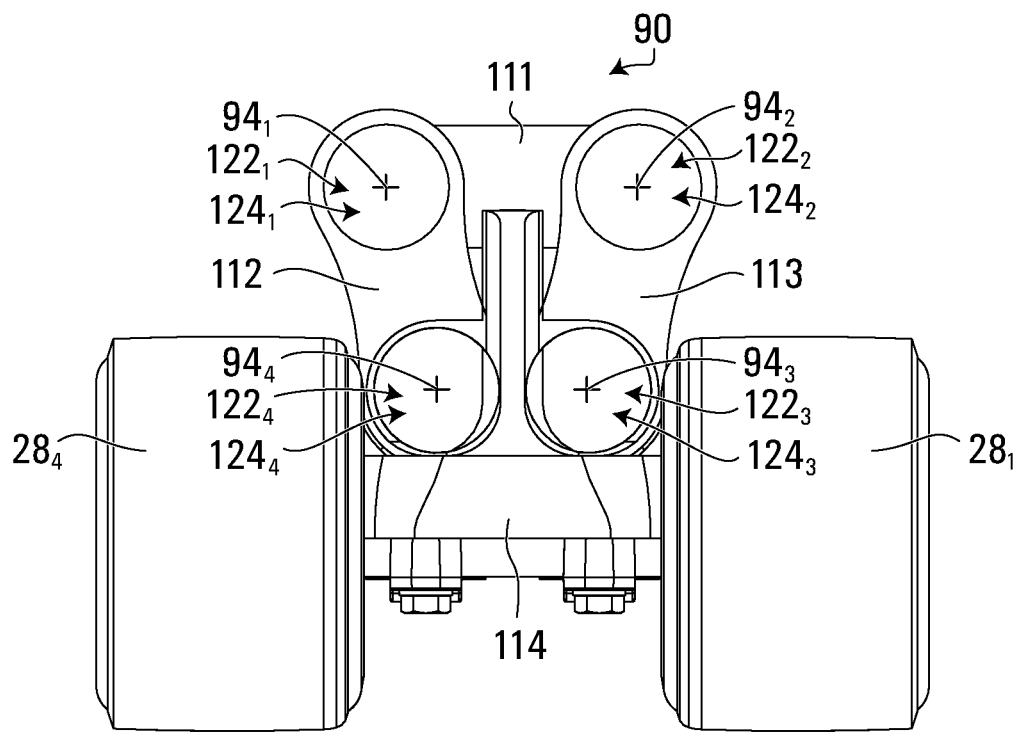
FIGS. 20A and 21A show front views of the bogie when the agricultural vehicle is on a flat surface.
Figure 20B:
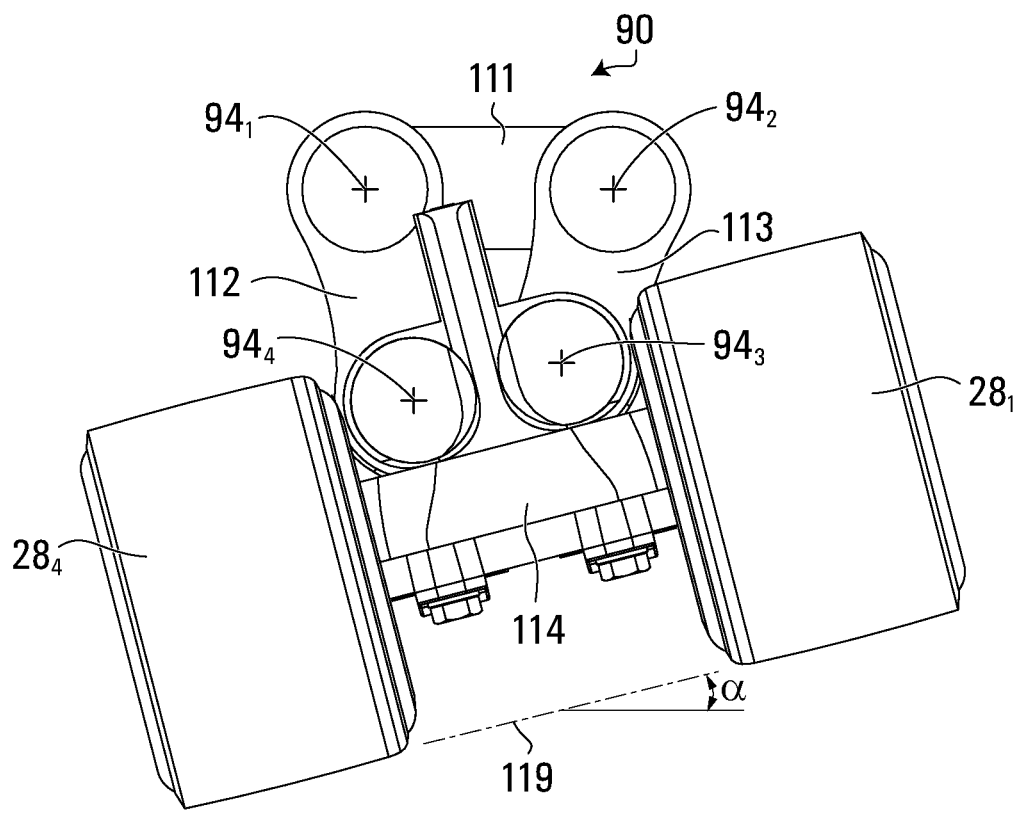
FIGS. 20B and 21B show front views of the bogie when the agricultural vehicle is on an inclined surface.
Figure 21A:
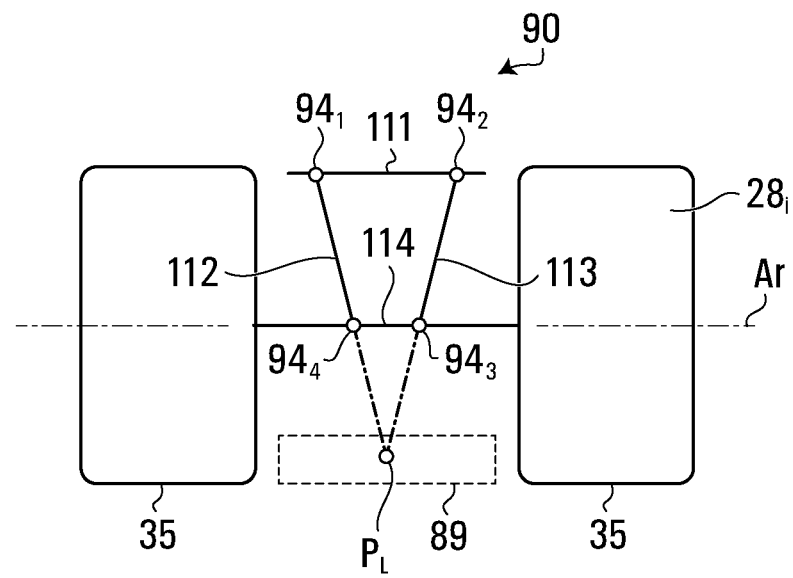
Figure 21B:
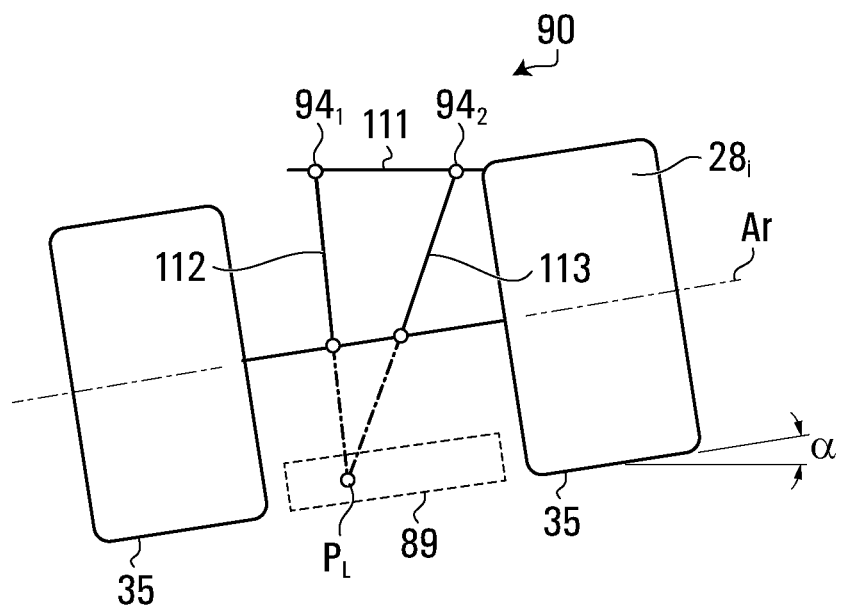

With continued reference to FIGS. 20 and 21, in this embodiment, the track system 16$_i$ is configured to allow a location of the pivot axis P$_L$ that is lower in the heightwise direction of the track system 16$_i$ (e.g., and that may be closer to the inner surface 55 of the carcass 36 in some cases). Notably, the pivot axis P$_L$ is below the axes of rotation A$_R$ of the given ones of the mid-rollers 28$_1$-28$_6$.

More particularly, in this embodiment, the pivot axis P$_L$ is below the top surface 86 of each drive/guide projection 48$_i$ of the track 22. In this example, the pivot axis P$_L$ is below a midpoint of the drive/guide projection 48$_i$ in the heightwise direction of the track system 16$_i$. In this case, the pivot axis P$_L$ is closer to the inner surface 55 of the carcass 36 than to the axes of rotation A$_R$ of the given ones of the mid-rollers 28$_1$-28$_6$ in the heightwise direction of the track system 16$_i$. Also, in this case, the pivot axis P$_L$ is closer to a bottom 35 of each of the given ones of the mid-rollers 28$_1$-28$_6$ (i.e., a lower end of the given ones of the mid-rollers 28$_1$-28$_6$ in the heightwise direction which is configured to at least occasionally contact the inner surface 55 of the carcass 36) than to the axes of rotation A$_R$ of the given ones of the mid-rollers 28$_1$-28$_6$ in the heightwise direction of the track system 16$_i$.

More particularly, in this embodiment, the pivot axis P$_L$ is close to an imaginary line 119 connecting the bottom 35 of two given ones of the roller wheels 28$_1$-28$_6$ which face each other on opposed sides of the track system 16$_i$. When the roller wheels 28$_1$-28$_6$ engage the track, the imaginary line 119 may intersect contact points between the respective ones of the roller wheels 28$_1$-28$_6$ and the inner surface 55 of the carcass 36. For example, in some embodiments, a smallest distance between the pivot axis P$_L$ and the imaginary line 119 and/or a distance in a height direction (e.g., a height) of the track system 16$_i$ between the pivot axis P$_L$ and a contact point between a respective one of the roller wheels 28$_1$-28$_6$ and the inner surface 55 of the carcass 36, may be no more than 60 mm, in some embodiments no more than 45 mm, in some embodiments no more than 30 mm, in some embodiments no more than 15 mm, in some embodiments even less (e.g., less than 15 mm). As another example, in some embodiments, a ratio of: (i) the smallest distance between the pivot axis P$_L$ and the imaginary line 119, and (2) a radius of the two given ones of the roller wheels 28$_1$-28$_6$, is no more than 0.9, in some embodiments no more than 0.6, in some embodiments no more than 0.3, in some embodiments no more than 0.1, and in some embodiments even less (e.g., less than 0.1).

The relatively low position of the pivot axis P$_L$ may enable to reduce lateral movement of the mid-rollers 28$_1$-28$_6$ relative to the track 22 generated during a rotation (i.e., pivoting motion) of the mid-rollers 28$_1$-28$_6$ about the pivot axis P$_L$, relative to the frame 13 of the track system 16$_i$. This may have beneficial consequences. For example, this may help avoiding contact between the mid-rollers 28$_1$-28$_6$ and the drive/guide lug 48$_i$, which could potentially overheat the track 22 during use and/or damage the mid-rollers 28$_1$-28$_6$ and/or the drive/guide lug 48$_i$. Consequently, the relatively low position of the pivot axis P$_L$ may also allow the mid-rollers 28$_1$-28$_6$ to have wider circumferential surfaces relative to the width of the track 22, while also having an enhanced rotational range of motion of the mid-rollers $28_1$-$28_6$ about the pivot axis $P_L$, relative to the frame 13 of the track system $16_i$.

As another example, this may allow the mid-rollers $28_1$-$28_6$ to be pivotable about the pivot axis $P_L$ by a greater angle. For example, in some embodiments, each of the mid-rollers $28_1$-$28_6$ may be pivotable about the pivot axis $P_L$ by at least +/−1° from a rest position of that mid-roller, in some cases by at least +/−2° from the rest position of that mid-roller, in some cases by at least +/−3° from the rest position of that mid-roller, in some cases by at least +/−5° from the rest position of that mid-roller, in some cases by at least +/−7° from the rest position of that mid-roller, in some cases by at least +/−10° from the rest position of that mid-roller, in some cases by even more (e.g., at least +/−15°).

As another example, this may also allow the track 22 and the mid-rollers $28_1$-$28_6$ to be configured such that the mid-rollers $28_1$-$28_6$ occupy a significant portion of spaces between the lateral surfaces $81_1$, $81_2$ of each drive/guide lug $48_i$ and lateral edges $49_1$, $49_2$ of the track 22, such that a width of a contact area between each one of the mid-rollers $28_1$-$28_6$ and the track 22 is significant. Since a force (e.g., part of a weight of the agricultural vehicle 10) is applied by the mid-rollers $28_1$-$28_6$ on the track 22, this may allow a reduction of the stress applied by the mid-rollers $28_1$-$28_6$ on the track 22, allowing increased performances and durability.

As another example, this may also allow a lateral oscillation of the mid-rollers $28_1$-$28_6$ while requiring a spacing between respective mid-rollers $28_1$-$28_6$ that is substantially the same as or less than the spacing that would be required if there were no lateral oscillation. Notably, when a lateral oscillation pivot of mid-rollers is too high, lateral oscillation of mid-rollers may cause lateral movement of the mid-rollers relative to the idler wheels and/or the track, such that there may be an increased risk of contact between mid-rollers and drive/guide lugs which may prematurely damage the mid-rollers and/or the track and spacing between respective mid-rollers may be significantly increased to mitigate this. In contrast, in this embodiment, since the pivot axis $P_L$ of the mid-rollers $28_1$-$28_6$ is relatively low, there is less lateral oscillation of the mid-rollers $28_1$-$28_6$ or no lateral oscillation of the mid-rollers $28_1$-$28_6$ at all when the mid-rollers $28_1$-$28_6$ roll about the pivot axis $P_L$ and therefore spacing between respective mid-rollers $28_1$-$28_6$ may be reduced. For example, in some embodiments, a dimension $D_G$ of a gap between each of the mid-rollers $28_1$-$28_6$ and a given one of the lateral surfaces $81_1$, $81_2$ of each drive/guide projection $48_i$ in the widthwise direction of the track system $16_i$ in the rest position of that mid-roller is no more than 24 mm, in some embodiments no more than 19 mm, in some embodiments no more than 15 mm, in some embodiments no more than 12 mm, and in some embodiments even less. As another example, a ratio of (i) the dimension $D_G$ of a gap between each of the mid-rollers $28_1$-$28_6$ and a given one of the lateral surfaces $81_1$, $81_2$ of each drive/guide projection $48_i$ in the widthwise direction of the track system $16_i$ in the rest position of that mid-roller over (ii) the width of the track 22, is no more than 5%, in some cases no more than 4%, in some cases no more than 3%, and in some cases even less.

As another example, this may also allow a lateral oscillation of the mid-rollers $28_1$-$28_6$ while preserving or increasing a durability of the track 22. For example, in some occasions, the weight of the agricultural vehicle 10 may cause the track system $16_i$ and the track 22 to laterally move relative to one another. For example, when travelling on a sufficiently steep side hill (i.e. a inclined surface having a gradient of inclination that is transversal to the longitudinal axis of the agricultural vehicle), a track system may have a tendency to laterally "slide" downhill relative to a track while inversely the track may have a tendency to laterally "slide" uphill relative to the track system. Practically, since the track may be laterally affixed relative to the track system at the drive wheel, the track may be laterally centered with the front idler wheels of the track systems but may be laterally misaligned with the roller wheels and the rear idler wheels. In some cases, the track may laterally move relative to the track system until at least one roller wheels contacts a lateral side of a drive/guide projection, thereby stopping the lateral movement of the track relative to the track system. Since in some cases the lateral spacing between respective roller wheels is greater than a lateral spacing between respective idler wheels, if the track laterally moves until there is contact between a lateral side of a drive/guide projection and at least one roller wheel, a given one of the rear idler wheels may roll over a portion of the drive/guide projections which may damage the track. Further, when a lateral oscillation pivot of mid-rollers is too high, in addition to the lateral "slide" of the track system relative to the track, a lateral movement of the mid-rollers relative to the idler wheels and/or the track caused by a lateral oscillation of mid-rollers may delay the contact between a lateral side of a drive/guide projection and at least one roller wheel, thereby increasing an extent of the portion of the drive/guide projections rolled over by a rear idler wheel.

Figure 22A:
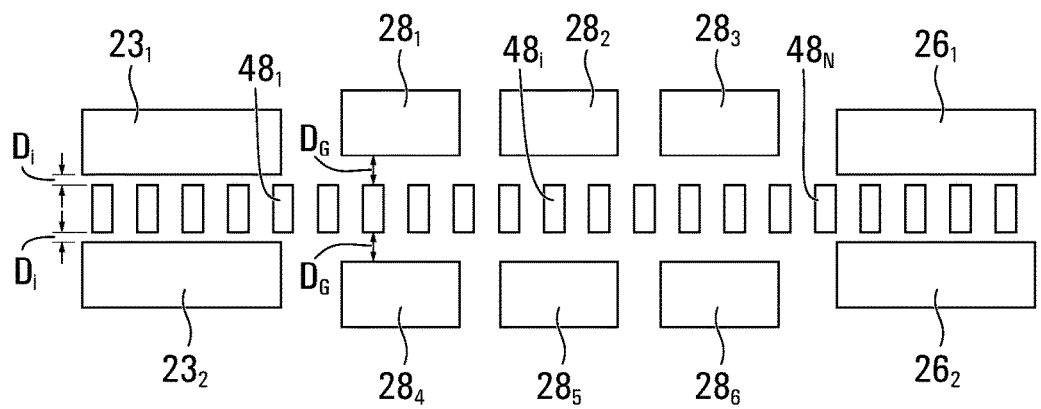
FIG. 22A shows a positioning of the mid-rollers and idlers of the track-engaging assembly relative to the drive/guide projections of the track when the agricultural vehicle is on a flat surface.
Figure 22B:
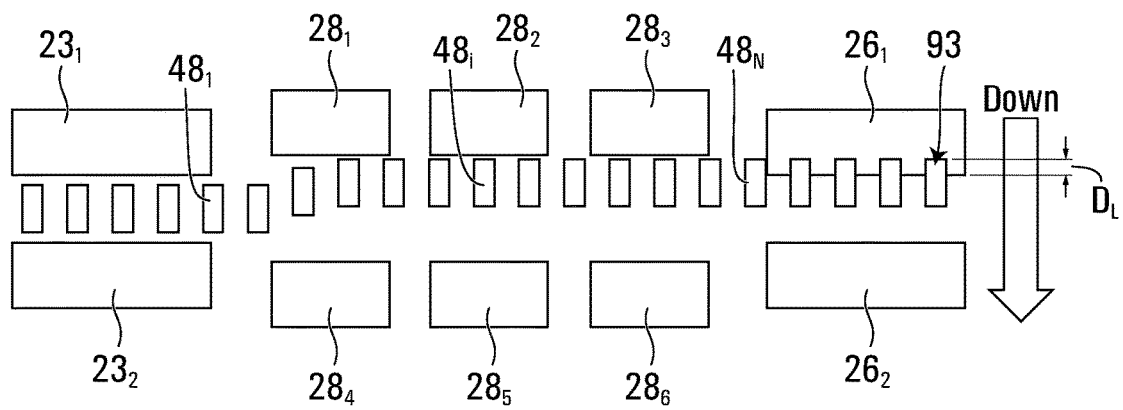
FIG. 22B shows a positioning of the mid-rollers and the idlers relative to the drive/guide projections of the track when the agricultural vehicle is on a laterally steep surface.

In this embodiment, the bogie 85 may allow a lateral oscillation of the mid-rollers $28_1$-$28_6$ while limiting a maximal extent of the drive/guide lug 48; that can be rolled upon by one of the rear idler wheels $26_1$, $26_2$ when the agricultural vehicle 10 travels on a side hill or a lateral steep surface. Referring to FIGS. 22A and 22B, in some embodiments, a ratio of (i) the dimension $D_G$ of the gap between each of the mid-rollers $28_1$-$28_6$ and a given one of the lateral surfaces $81_1$, $81_2$ of each drive/guide projection $48_i$ in the widthwise direction of the track system $16_i$ in the rest position of that mid-roller over (ii) a dimension $D_i$ of a gap between each of the idler wheels $23_1$, $23_2$, $26_1$, $26_2$ and a given one of the lateral surfaces $81_1$, $81_2$ of each drive/guide projection $48_i$ in the widthwise direction of the track system $16_i$ in the rest position of that idler wheel is no more than 4, in some embodiments no more than 3, in some embodiments no more than 2, and is some embodiment even less (e.g., no more than 1.5). As another example, in some embodiments, a difference between (i) the dimension $D_G$ of the gap between each of the mid-rollers $28_1$-$28_6$ and a given one of the lateral surfaces $81_1$, $81_2$ of each drive/guide projection 48; in the widthwise direction of the track system $16_i$ in the rest position of that mid-roller over (ii) the dimension $D_i$ of the gap between each of the idler wheels $23_1$, $23_2$, $26_1$, $26_2$ and a given one of the lateral surfaces $81_1$, $81_2$ of each drive/guide projection $48_i$ in the widthwise direction of the track system $16_i$ in the rest position of that idler wheel is no more than 18 mm, in some embodiments no more than 12 mm, in some embodiments no more than 6 mm, and is some embodiment even less (e.g., no more than 3 mm). In some embodiments, a ratio of: (i) the maximal extent DL of a portion 93 of the drive/guide lug $48_i$ that can be rolled upon by one of the rear idler wheels $26_1$, $26_2$ when the agricultural vehicle 10 travels on a side hill; over (ii) a difference between (a) the dimension $D_G$ of the gap between each of the mid-rollers $28_1$-$28_6$ and a given one of the lateral surfaces $81_1$, $81_2$ of each drive/guide projection $48_i$ in the widthwise direction of the track system $16_i$ in the rest position of that mid-roller over (b) the dimension $D_i$ of the gap between each of the idler wheels $23_1$, $23_2$, $26_1$, $26_2$ and a given one of the lateral surfaces $81_1$, $81_2$ of each drive/guide projection $48_i$ in the widthwise direction of the track system $16_i$ in the rest position of that idler wheel, may be no more than 4, in some embodiments no more than 2, in some embodiments no more than 1.5, in some embodiments no more than 1.0, and in some embodiments even less.

As yet another example, in some embodiments, also, a ratio of (i) the dimension $D_G$ of the gap between each of the mid-rollers $28_1$-$28_6$ and the given ones of the lateral surfaces $81_1$, $81_2$ of each drive/guide projection $48_i$ in the widthwise direction of the track system $16_i$ in the rest position of that mid-roller over (ii) the width of the track 22 in some cases no more than 4%, in some cases no more than 3%, in some cases no more than 2%, in some cases no more than 1%, and in some cases even less (e.g., no more than 0.5%).

The relatively low position of the pivot axis $P_L$ may also enable to reduce heightwise movement of the mid-rollers $28_1$-$28_6$ relative to the track 22 generated during a rotation of the mid-rollers $28_1$-$28_6$ about the pivot axis $P_L$, relative to the frame 13 of the track system $16_i$. Such heightwise movement may otherwise reduce the contact patch of the track 22, may reduce a contact area between the mid-rollers $28_1$-$28_6$ and the inner surface 55 of the carcass 36, and/or may increase wheel pressure on the inner surface 55 of the carcass 36, which may lead to damaging the track 22 and/or the inner surface 55 of the carcass 36.

In this embodiment, the pivot axis $P_L$ is a virtual pivot axis. That is, the virtual pivot axis $P_L$ is an imaginary pivot axis about which the given ones of the mid-rollers $28_1$-$28_6$ can be viewed as effectively pivoting, even though there is not necessarily an actual physical pivot where it is located.

Although in some embodiments the virtual pivot axis $P_L$ me be movable relative to the frame 13 of the track system $16_i$, the track 22 and the bottom 35 of the mid-rollers $28_1$-$28_6$ depending on an angular position of the mid-rollers $28_1$-$28_6$ relative to the frame 13 of the track system $16_i$, in this embodiment, the pivot axis $P_L$ may be configured to remain in a position relative to the track 22 and the bottom 35 of the mid-rollers $28_1$-$28_6$ that is limited to a spatially limited area 89 when the mid-rollers $28_1$-$28_6$ rotate within a certain range (e.g., within 3°) about the pivot axis $P_L$ and relative to the frame 13 of the track system $16_i$. A width of the area 89 is relatively limited. For example, in some embodiments, a ratio of the width of the area 89 over a distance between a pair of laterally-adjacent mid-rollers $28_1$-$28_6$ in the widthwise direction of the tack system $16_i$ may be no more than 0.85, in some cases no more than 0.80, in some cases no more than 0.75, and in some cases even less, and a ratio of the height of the area 89 over a distance between a pair of laterally-adjacent mid-rollers $28_1$-$28_6$ in the widthwise direction of the tack system $16_i$ may be no more than 0.85, in some cases no more than 0.80, in some cases no more than 0.75, and in some cases even less.

More particularly, in this embodiment, the bogie 85 comprises a linkage mechanism 90 that implements the virtual pivot axis $P_L$. The linkage mechanism 90 is configured to project the virtual pivot axis $P_L$ outside of the linkage mechanism 90, such that the virtual pivot axis $P_L$ does not intersect the linkage mechanism 90. To that end, in this embodiment, the linkage mechanism 90 comprises a plurality of links 111, 112, 113, 114 that are pivotably interconnected and arranged to connect the mid-rollers $28_1$-$28_6$ to the frame 13 of the track system $16_i$. Rotation of two pivoting links (e.g., cranks) of the linkage mechanism 90, namely the links 112, 113, causes translation and rotation of a connecting link (e.g., coupler) of the linkage mechanism 90 (namely the link 114) that pivotally connects to each of the two pivoting links 112, 113 about a virtual pivot point. Without being bound by theory, the pivot point is the intersection between two imaginary lines: a first one of the imaginary lines intersecting pivot points $94_1$, $94_4$ of the link 112, and the second one of the imaginary lines intersecting pivot points $94_2$, $94_3$ of the link 113. The virtual pivot axis $P_L$ is orthogonal to the plane of rotation of the cranks 112, 113 and passes through the virtual pivot point.

In this embodiment, the linkage mechanism 90 is a four-bar linkage mechanism. In particular, the four-bar linkage mechanism 90 comprises the four links 111, 112, 113, 114 that are pivotably connected to link the mid-rollers $28_1$-$28_6$ to the frame 13 of the track system $16_i$. At least some of the links 111, 112, 113, 114 may comprise a plurality of linking members that are rigidly connected to move together in unison as one. Specifically, in this embodiment, the links 112, 113 each comprise two linking members that are spaced from one another and aligned with one another in a longitudinal direction of the bogie 85, and that are rigidly connected to move together in unison as one.

In this embodiment, the first link 111 is a frame link, the second link 112 is a first crank, the third link 113 is a second crank, the fourth link 114 is a coupler, and the first and second cranks 112, 113 converge from the frame link 111 to the coupler 114.

At least part (i.e., part of or an entirety of) of the first crank 112, the second crank 113 and the coupler 114 may extend between a given pair of mid-rollers $28_1$-$28_6$ (that is, part of at least one of the first crank 112, the second crank 113 and the coupler 114 may extend between a given pair of mid-rollers $28_1$-$28_6$). More specifically, in this embodiment, part of the first crank 112, part of the second crank 113 and the entire coupler 114 extend between a given pair of mid-rollers $28_1$-$28_6$.

In some embodiments, the linkage mechanism 90 may comprise a suspension system configured to manage (i.e., absorb and/or dampen) vibrations. The linkage mechanism 90 may comprise a plurality of pivot points $94_1$-$94_4$ between respective ones of the frame link 111, the first crank 112, the second crank 113 and the coupler 114; and the suspension system may comprise a plurality of resilient members $122_1$-$122_4$ configured to resiliently change in configuration to absorb and/or dampen vibrations and disposed at respective ones of the pivot points $94_1$-$94_4$. For instance, in some embodiments, each of the resilient members $122_1$-$122_4$ may comprise a spring and/or a damper (e.g., a shock absorber).

Figure 23:
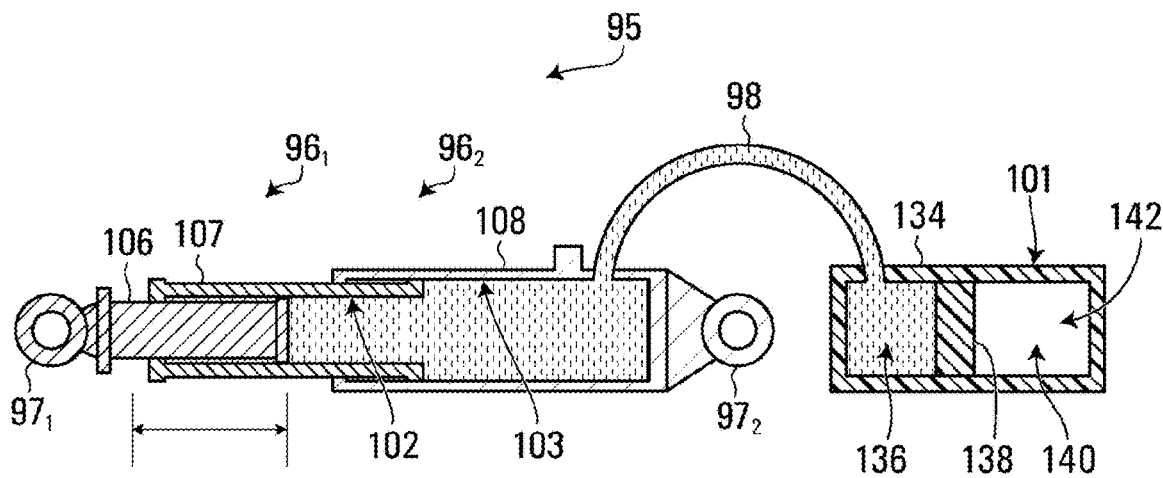
FIG. 23 shows a cross-sectional view of a tensioner of the track system according to an embodiment.
Figure 25:
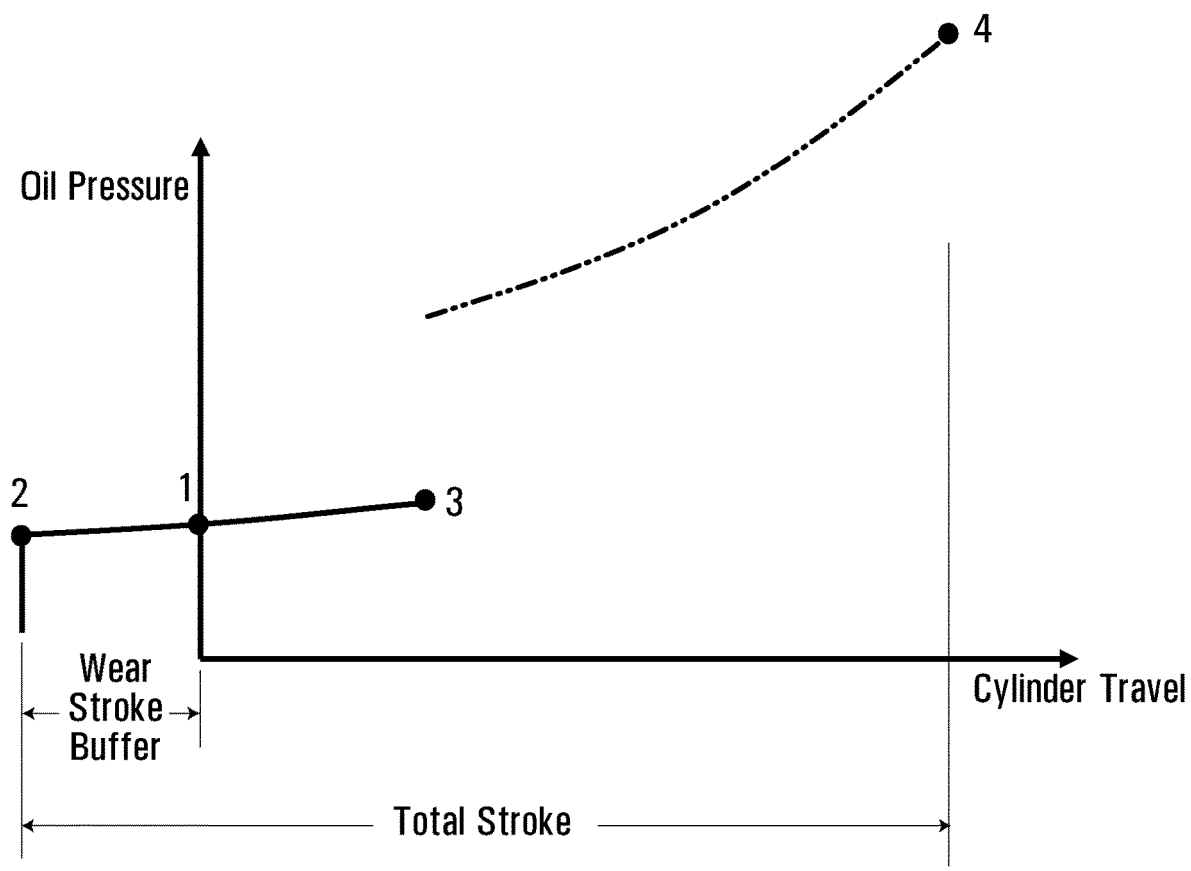
FIG. 25 shows an example of a curve of oil pressure inside the tensioner during different stages of a total stroke of the tensioner.

With additional reference to FIGS. 23 and 25, in this embodiment, the tensioner 95 is configured to control the tension of the track in a plurality of stages in which the tension of the track is controlled differently. This may allow the tensioner 95 to better manage the tension of the track 22, such as by having a nominal value of the tension of the track 22 that is lower, by allowing an increase of the tension of the track 22 in certain situations (e.g., braking or other rim pull events), and by being relatively compact.

For example, in this embodiment, the stage of the tensioner 95, which may be referred to as a "low-tension" stage, is configured to occur during normal operation of the track system $16_i$ without rim pull, whereas the stage of the tensioner 95, which may be referred to as a "high-tension" stage, is configured to occur in response to rim pull such that the tensioner 95 is configured to maintain the tension of the track 22 higher during the high-tension stage than during the low-tension stage.

In this embodiment, the tensioner 95 comprises a plurality of tensioning elements $96_1$, $96_2$ that are configured to control the tension of the track 22 differently, in order to implement the low-tension stage and the high-tension stage.

For example, in this embodiment, the tensioner 95 comprises a hydraulic cylinder 100 that comprises the tensioning elements $96_1$, $96_2$ which may comprise a plurality of hydraulic cylinder members 106, 107, 108. Thus, in this embodiment, where the tensioner 95 operates in its different stages, the hydraulic cylinder 100 is a plural-stage hydraulic cylinder (i.e., a hydraulic cylinder having a plurality of stages). More particularly, in this embodiment, the hydraulic cylinder 100 is a dual-stage hydraulic cylinder (i.e., the hydraulic cylinder has two stages). A first anchor $97_1$ of the tensioner 95 may be affixed to (e.g., by using a mechanical fastener, an adhesive, by being mechanically interlocked, etc.) or integral with (i.e., manufactured integrally with) the cylinder member 106, while a second anchor $97_2$ may be affixed to (e.g., by using a mechanical fastener, an adhesive, by being mechanically interlocked, etc.) or integral with (i.e., manufactured integrally with) the cylinder member 108.

In this embodiment, the cylinder members 106, 107, 108 are moveable relative to one another to allow the tensioner 95 to retract and/or expend. Specifically, the cylinder members 106, 107, 108 may be coaxial.

In this embodiment, each one of the tensioning elements $96_1$, $96_2$ may comprise a bore and a piston moveable within its respective bore such that the bore and the piston of each one of the tensioning elements $96_1$, $96_2$ are telescopically moveable relative to one another.

For example, in this specific embodiment, the cylinder member 106 may be the piston of first tensioning element $96_1$ and the cylinder member 107 may comprise an internal surface which defines the bore 102 of the first tensioning element $96_1$. Therefore, the piston 106 is moveably connected and telescopically moveable relative to the cylinder member 107. In the embodiment, also, the cylinder member 108 may comprise an internal surface which defines the bore 103 of the second tensioning element $96_2$ and an end of the cylinder member 107 may be moveably disposed within the bore 103 of the second tensioning element $96_2$. In this regard, the cylinder member 107 also acts as the piston of the second tensioning element $96_2$. Therefore, the cylinder member 107 is moveably connected and telescopically moveable relative to the cylinder member 108.

A common hydraulic accumulator 101, which is configured to accumulate hydraulic fluid of the hydraulic cylinder 100 in an accumulation chamber 136, may be connected to the hydraulic cylinder 100 via a channel 98. More specifically, in this embodiment, the common hydraulic accumulator 101 further comprises a housing 134 comprising the accumulation chamber 136, a piston 138 moveable relative to a housing 134 and a compressible chamber 140 formed by the housing 134 and the piston 138 and which may comprise a spring or a compressible fluid 142 effectively acting as a spring to exert a force against the piston 138. In this embodiment, the compressible fluid 142 is a gas and the gas is nitrogen. The housing 134 and the piston 138 may create an hermetic joint which allows the compressible chamber 140 to hermetically contain the nitrogen at a relatively high pressure such that the nitrogen exerts a force on the piston 138 that is transferred to the hydraulic cylinder 100 via the fluid flowing in the channel 98.

In this embodiment, the common hydraulic accumulator 101 is directly connected to a given one of the bores 102, 103 and thereby indirectly connected to the other one of the bores 102, 103, since the bores 102, 103 are hydraulically connected to one another. In variants, the common hydraulic accumulator 101 may directly connected to each one of the bores 102, 103.

In this embodiment, the tensioning elements $96_1$, $96_2$ may be configured to cause the tension of the track 22 to be lower when the piston of the first tensioning element $96_1$ moves within the bore 102 of the first tensioning element $96_1$, causing the first tensioning elements $96_1$ to determine the tension of the track 22, than when the piston of the second tensioning element $96_2$ moves within the bore 103 of the second tensioning element 96, causing the tensioning element $96_2$ to determine the tension of the track 22. In this case, the first tensioning element $96_1$ has a resistance to movement and/or to compression that is lower than the second tensioning element $96_2$. In other words, the tensioning element $96_2$ is configured to exert a greater force onto the track 22 than the first tensioning element $96_1$ In some embodiment, the bores 102, 103 may be dimensioned differently to achieve the above. More particularly, in this embodiment, the second bore 103 is cross-sectionally larger than the first bore 102. Also, in this embodiment, strokes through each one of the bores 102, 103 may be different in length. More specifically, the maximal (i.e., longest possible) stroke through the bore 102 is longer than the maximal (i.e., longest possible) stroke through the bore 103.

The difference between resistance to movement and/or to compression of the first tensioning element $96_1$ and resistance to movement and/or to compression of the second tensioning element $96_2$ allows ease of installation and ensures that the track 22 remains over the track system $16_i$ during reverse rim-pull events, while enhancing performances during use and increasing durability of the track 22. In other words, the tensioning elements $96_1$, $96_2$ are configured to maintain the tension of the track 22 sufficiently high to cause the drive projections of the track 22 to remain properly engaged with the drive members of the drive wheel in response to reverse rim pull, and to prevent ratcheting of respective ones of the drive/guide lugs $48_1$-$48_j$ of the track 22 over respective ones of the drive members of the drive wheel in response to reverse rim pull, while maintaining the track 22 at a tension that is no more or below a nominal tension of the track 22 during normal operation of the agricultural vehicle 10 (e.g., excluding reverse rim pull events). In some embodiments, the tensioning elements $96_1$, $96_2$ are configured such that the tension of the track 22 when it is controlled by the first tensioning element $96_1$ is no more than two-thirds of the tension of the track 22 when it is controlled by the second tensioning element $96_2$, while in some embodiments it is no more than half or less than half of the tension of the track 22 when it is controlled by the second hydraulic cylinder $96_2$.

In this regard, the first tensioning element $96_1$ may as act to allow the track 22 to maintain its nominal tension at rest and/or during normal operations, while the second tensioning element $96_2$ may act to allow the track 22 to maintain a sufficient tension to remain over the track assembly $16_i$ during events which tend to diminish the tension of the track 22 (e.g., rim pull events). For instance, in some embodiments, the first tensioning element $96_1$ is configured to maintain the tension of the track 22 within 50% of the nominal value of the tension of the track 22, in some embodiments within 40% of the nominal value of the tension of the track 22, in some embodiments within 33% of the nominal value of the tension of the track 22, and in some embodiments within an even smaller margin (e.g. within less than 30% of the nominal value of the tension of the track 22).

The multi stages of the tensioner 95 may allow the tensioner to be more compact relative to a size of the track system $16_i$. For instance, in some embodiments, the track system $16_i$ may have a length of at least 2600 mm and a length of the tensioner 95 may be no more than 500 mm, in some embodiments no more than 450 mm, and in some embodiments no more than 410 mm, whereas a standard tensioner would require a length of at least 510 mm. For instance, in some embodiments, a ratio of the length of the tensioner 95 over a length of the track system $16_i$ is no more than 19%, in some embodiments no more than 17%, in some embodiments no more than 15%, and in some embodiments even less.

The track system $16_i$ may be implemented in any other suitable manner in other embodiments.

For example, in some embodiments, the linking members of four-bar linkage mechanism 90 of the bogie 85 the may not be rigidly connected to one another. In other words, in some embodiments, a configuration of a front portion of the four-bar linkage mechanism 90 may be different from a configuration of a rear portion of the four-bar linkage mechanisms 90 such that two given pairs of the mid-rollers $28_1$-$28_6$, each pair being longitudinally spaced from the other pair, may be rotatable about two different, distinct pivot axis $P_L$ and may have angular positions relative to the frame 13 of the track system $16_i$ that are different from one another. In this example, each one of the distinct pivot axis $P_L$ may be substantially parallel to a longitudinal direction of the track system $16_i$, and may be located below the axis of rotation of each wheel of the respective pair of the mid-rollers $28_1$-$28_6$ rotating about the pivot axis $P_L$.

As another example, in some embodiments, the track system $16_i$ may comprise a plurality of bogies 85 carrying mid-rollers. Each bogie 85 may comprise a four-bar linkage mechanism 90 such that in some occasions, configurations of the four-bar linkage mechanisms 90 of each one of the bogies 85 may be different. Then again, two given pairs of the mid-rollers $28_1$-$28_6$, each pair being on a different one of the bogies 85, may be rotatable about two different, distinct pivot axis $P_L$ and may have angular positions relative to the frame 13 of the track system $16_i$ that are different from one another. In this example, each one of the distinct pivot axis $P_L$ may be substantially parallel to a longitudinal direction of the track system $16_i$, and may be located below the axis of rotation of each wheel of the respective pair of the mid-rollers $28_1$-$28_6$ rotating about the pivot axis $P_L$.

Figure 24:
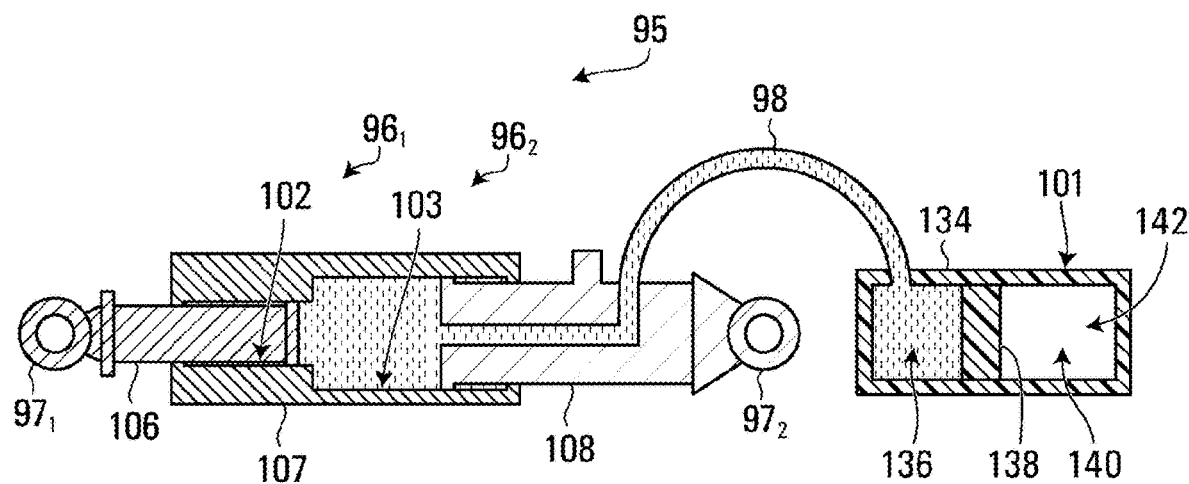
FIG. 24 shows a variant of the tensioner in another embodiment.

As another example, in some embodiments, as shown in FIG. 24, the bores 102, 103 of each one of the tensioning elements $96_1$, $96_2$ of the tensioner 95 may be disposed within and form internal surfaces of the intermediate cylinder member 107. In this example of implementation, the bores 102, 103 are fixed (i.e. not moveable) relative to one another. In this case, the cylinders members 106, 108 are the pistons of the tensioning elements $96_1$, $96_2$.

Figure 26:
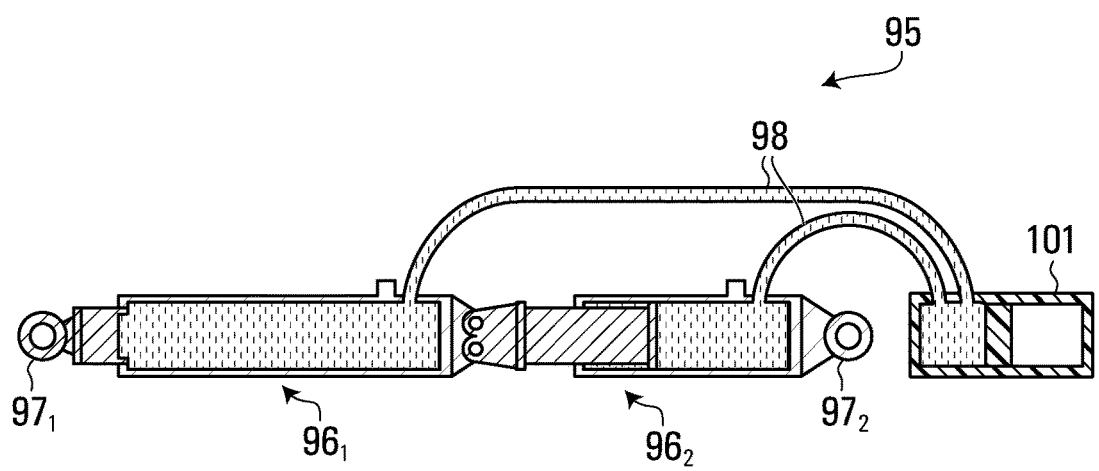
FIGS. 26 to 30 show variants of the tensioner in other embodiments.

As another example, in some embodiments, as shown in FIG. 26, the tensioner 95 may comprise two or more sets of traditional single-stage cylinders which are serially mounted to one another to implement the plural-stage tensioner 95. In this case, the hydraulic cylinders are serially connected to one another and are in hydraulic communication with one another. That is, the hydraulic cylinders are hydraulically connected such that hydraulic fluid contained in their respective bores flows between them.

Figure 28:
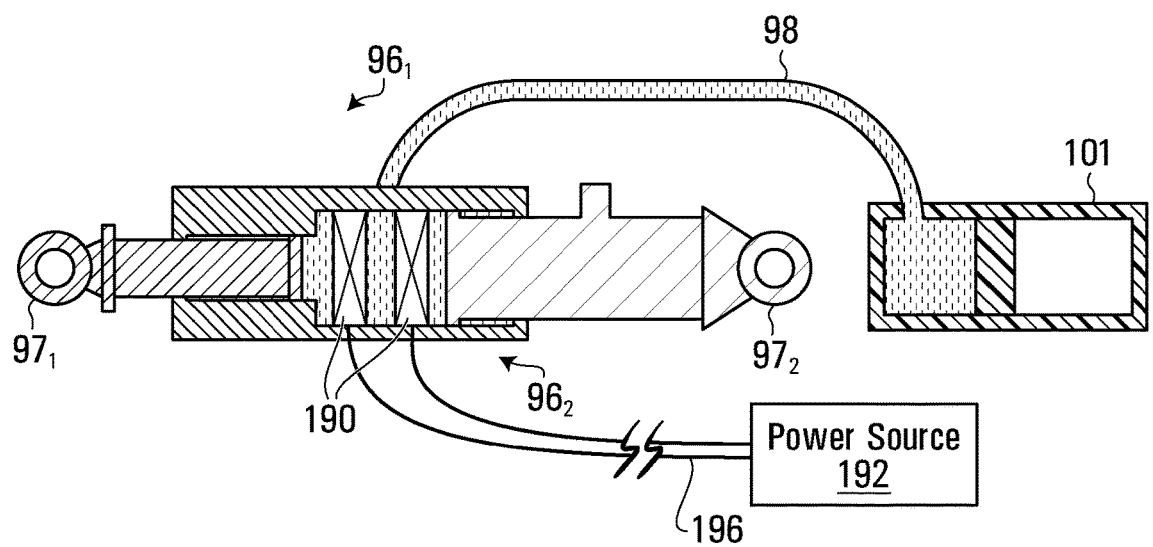

As another example, in some embodiments, as shown in FIG. 28, at least part of the tensioner 95 may be lockable to ensure that at least one tensioning element of the tensioner 95 preserves its length independently of the push/pull force on the tensioner 95. For example, each one of the tensioning elements $96_1$, $96_2$ may comprise a solenoid valve 190 configured to completely close the respective one of the bores 102, 103 in response to an electrical signal. For example, the agricultural vehicle 10 may be equipped with power source 192 and a signal generator (not shown) that is configured to generate and send an electric signal 196 to the solenoid valve 190 in response to a pre-determined event, such as a braking command, which would command the solenoid valve 190 to shut one or both the bores 102, 103, thereby effectively locking at least part of the tensioner 95 to ensure that the track 22 preserves its tension during the event.

Figure 27:
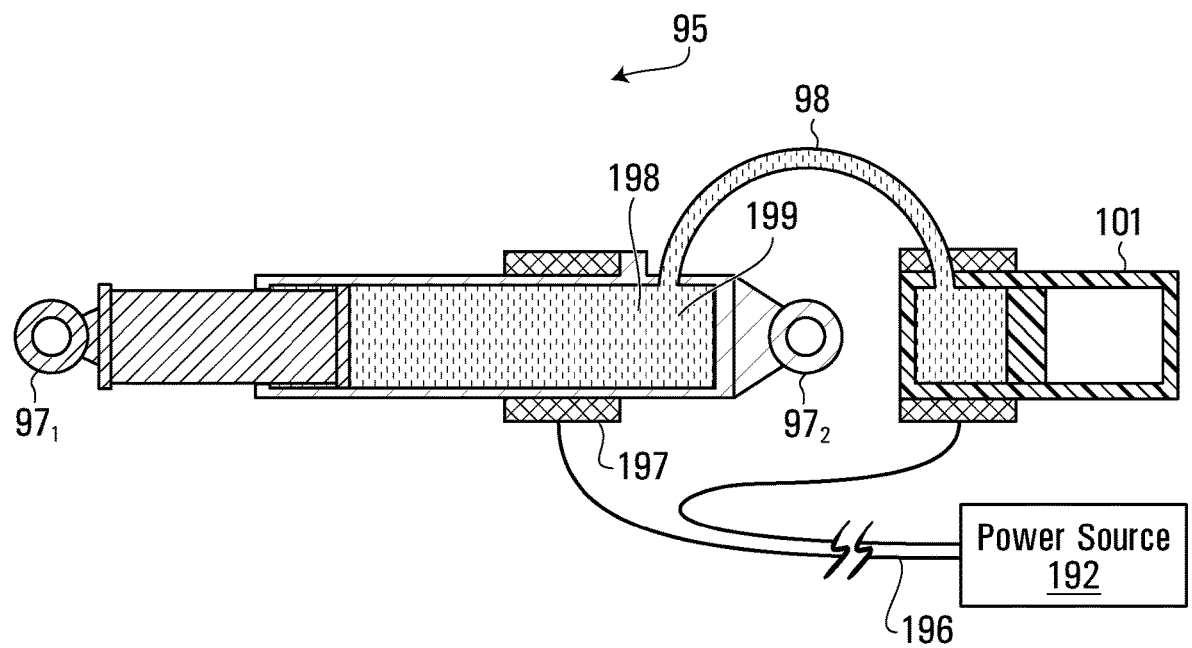

As another example, in some embodiments, as shown in FIG. 27, the tensioner 95 may be a single stage tensioner implementing a single tensioning element 96 having a bore and a piston. The single stage tensioner 95 may comprise an electromagnet 197 and a fluid 198 which comprises magnetic particles 199 such that the fluid 198 is magnetorheological. The agricultural vehicle 10 may be equipped with power source 192 and a signal generator that is configured to generate and send an electric signal 196 to the electromagnet 197 in response to a pre-determined event, such as a braking command, which would generate a magnetic field which would render the MR fluid 198 solid-like and would increase a resistance to compression/extension of the tensioner 95.

Figure 29:
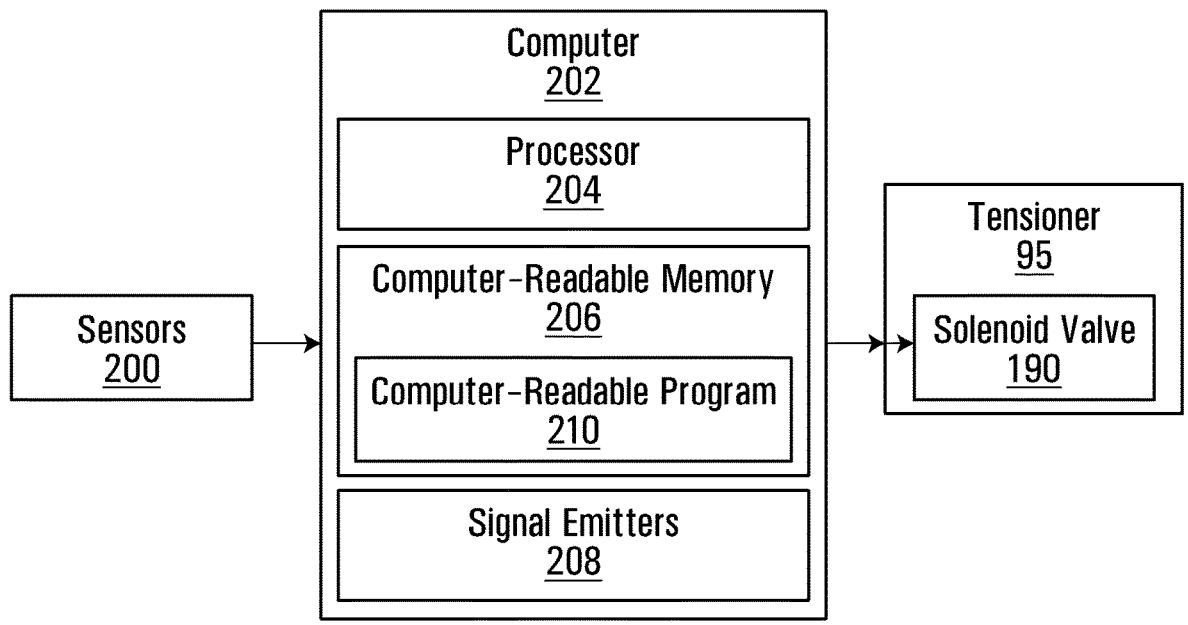
Figure 30:
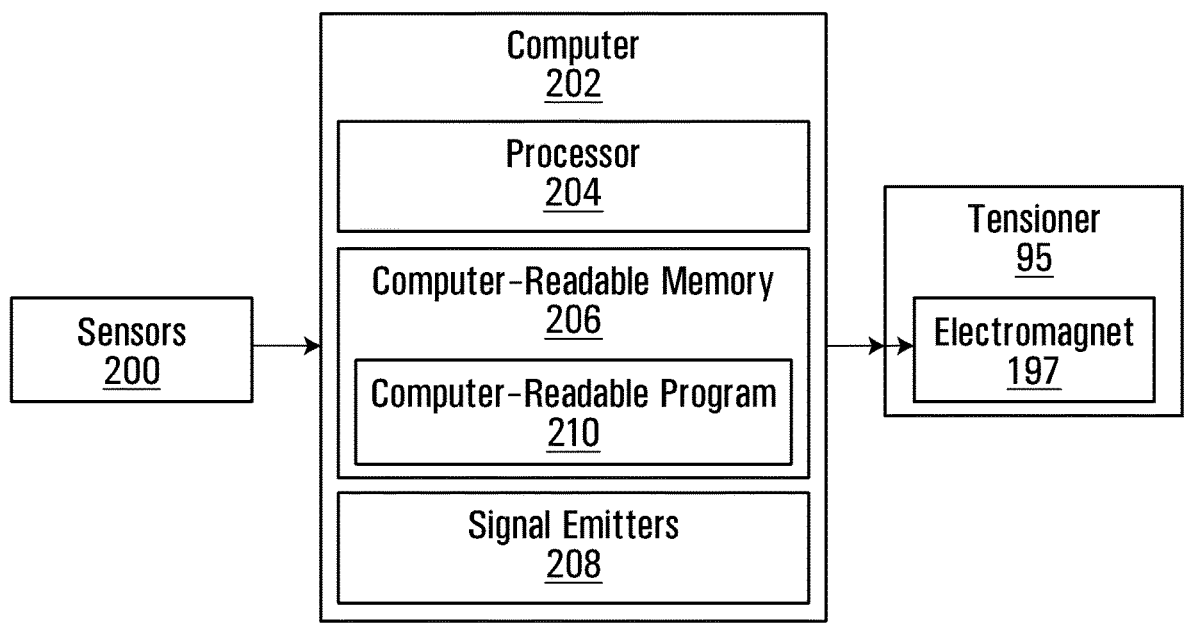

As another example, in some embodiments, as shown in FIGS. 29 and 30, the agricultural vehicle 10 is further equipped with sensors 200 to sense a parameter of the agricultural vehicle 10 (e.g. its speed, its inclination, its acceleration, etc.) and/or of the track system 16; (e.g. a tension of the track 22, a length of the tensioner 95, a speed of extension/contraction of the tensioner 95) and/or of a display computer which may be reactive to a user command (e.g. using a push-button, a radio button, a touch-screen, etc.). The agricultural vehicle 10 may further comprise a computer 202 implementing a processor 204, signal emitters 208 and computer-readable memory 206 which comprises a computer-readable program 210 to treat the signal of the sensors 200 and command the emitters 208 to generate an electric signal and send it to the tensioner 95 to control a state of the tensioner 95 (e.g., using the solenoid valve 190, using the electromagnet 197 to generate a magnetic field, etc).

Although the agricultural vehicle 10 illustrated in FIG. 1 is an agricultural tractor comprising four track systems $16_1$-$16_4$, different types of agricultural vehicles configured differently (e.g., having a different number of track systems) may implement improvements based on principles disclosed herein.

Figure 31:
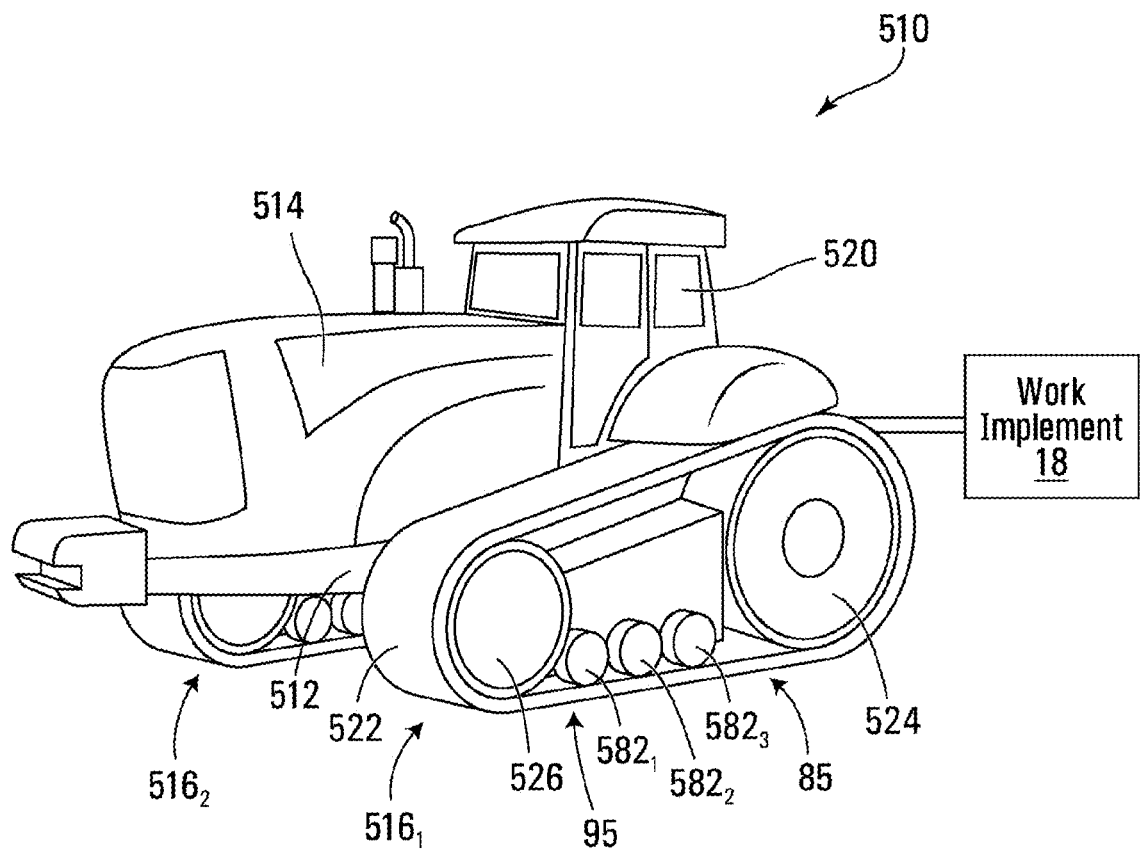
FIG. 31 shows an example of an agricultural vehicle comprising two track systems rather than four.

For instance, with additional reference to FIG. 31, an agricultural vehicle 510 may be provided comprising two track systems $516_1$, $516_2$ rather than four (i.e., one track system at each side of the agricultural vehicle 510). The agricultural vehicle 510 also comprises a frame 512, a prime mover 514, and an operator cabin 520 and can be equipped with the work implement 18 to perform agricultural work. Each track system $516_1$, $516_2$ comprises a drive wheel 524 at a first longitudinal end portion of the corresponding track system $516_1$, $516_2$, an idler wheel 526 at a second longitudinal end portion of the corresponding track system $516_1$, $516_2$ opposite to the first longitudinal end portion, and a plurality of mid-rollers $582_1$, $582_2$, $582_3$ intermediate the drive wheel 524 and the idler wheel 526. Each track system $516_1$, $516_2$ further comprises a track 522 disposed around the wheels 524, 526, $582_1$, $582_2$, $582_3$ and is driven by the drive wheel 524. Each track system $516_1$, $516_2$ may implement the bogie 85 and/or the tensioner 95 as described above. Additionally or alternatively, the track 522 may be configured in a manner similar to the track 22 as described in section 2 above.

Figure 32:
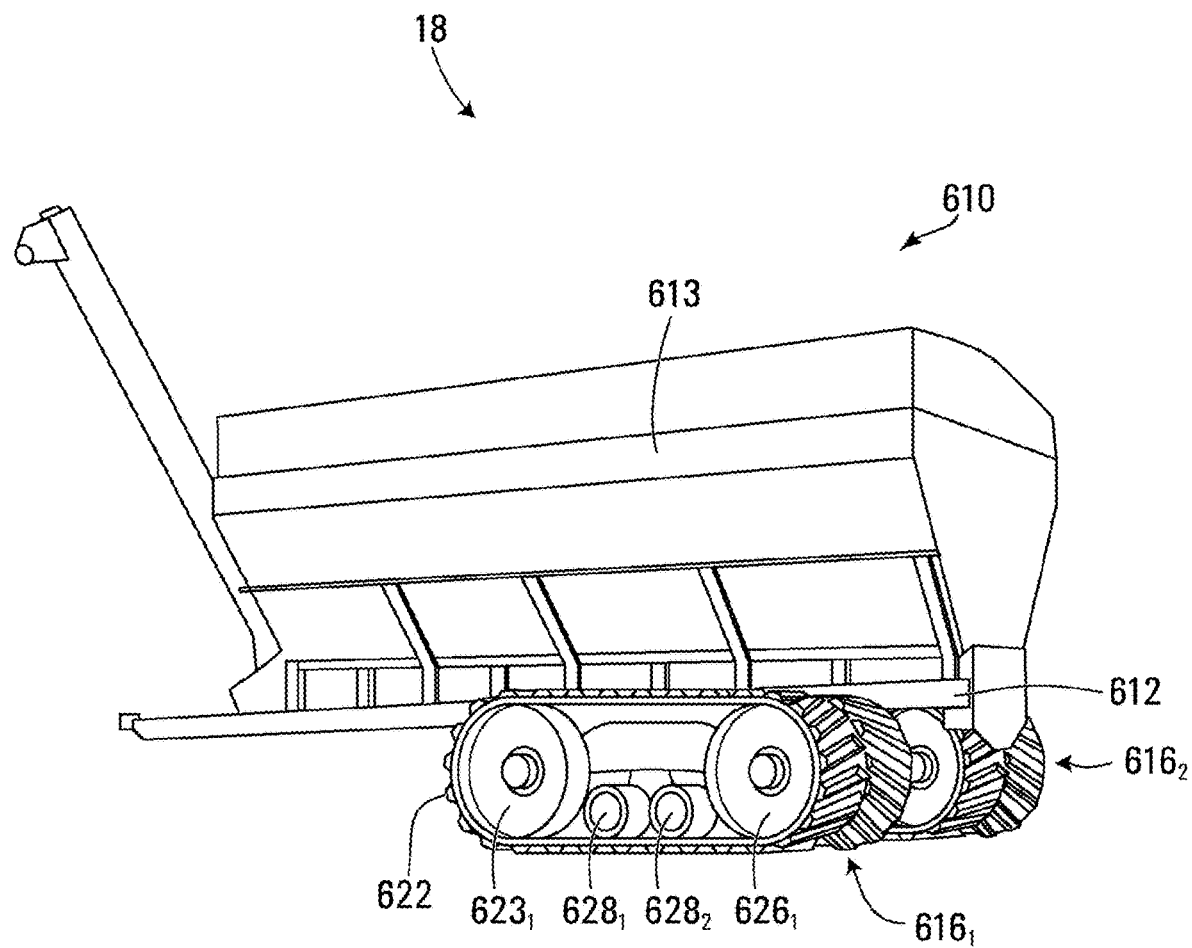
FIG. 32 shows an example of a trailed vehicle configured to be attached to the agricultural vehicle of FIG. 1 or 31.

Furthermore, the work implement 18 that is drawn by the agricultural vehicle 10 or the agricultural vehicle 510 may implement the improvements disclosed herein. For instance, with additional reference to FIG. 32, the work implement 18 may comprise a trailed vehicle 610 comprising a frame 612, a body 613 (e.g., a container) and track systems $616_1$, $616_2$. In this example, the trailed vehicle 610 is a harvest cart. In other examples, the trailed vehicle 610 may be a fertilizer cart, a sprayer, a planter or any other suitable type of trailed vehicle. Each track system $616_1$, $616_2$ of the trailed vehicle 610 comprises a front (i.e., leading) idler wheel $623_1$ at a first longitudinal end portion of the respective track system $616_1$, $616_2$, a rear (i.e., trailing) idler wheel 626 at a second longitudinal end portion of the respective track system $616_1$, $616_2$ opposite the first longitudinal end portion, and a plurality of mid-rollers $628_1$-$628_2$ intermediate the front idler wheels $623_1$ and the rear idler wheels $626_1$. Each track system $616_1$, $616_2$ further comprises a track 622 disposed around the wheels $626_1$, $626_1$, $628_1$-$628_2$. Each track system $616_1$, $616_2$ may implement the bogie 85 and/or the tensioner 95 as described above. Additionally or alternatively, the track 622 may be configured in a manner similar to the track 22 as described in section 2 above.

In this example, the trailed vehicle 610 is not motorized in that it does not comprise a prime mover for driving the track systems $616_1$, $616_2$. Rather, the trailed vehicle 610 is displaced by the agricultural vehicle 10 or the agricultural vehicle 510 to which the trailed vehicle 610 is attached. However, in some examples, the trailed vehicle 610 may be motorized. That is, the trailed vehicle 610 may comprise a prime mover for driving a drive wheel of each track system $616_1$, $616_2$. For example, instead of comprising rear idler wheels $626_1$, the track systems $616_1$, $616_2$ may comprise a drive wheel for driving the track 622.

Although in embodiments considered above the vehicle 10 is an agricultural vehicle operable by a user from the operator cabin 20, in some embodiments, the vehicle 10 may be operable by a user remotely. In some embodiments, the vehicle 10 may comprise autonomy features, allowing the vehicle 10 to be semi-autonomous and/or entirely autonomous. In some embodiments, the vehicle 10 may be free of any operator cabin.

While in embodiments considered above the vehicle 10 is an agricultural vehicle, in other embodiments, the vehicle 10 may be an industrial vehicle such as a construction vehicle (e.g., a loader, a telehandler, a bulldozer, an excavator, etc.) for performing construction work or a forestry vehicle (e.g., a feller-buncher, a tree chipper, a knuckleboom loader, etc.) for performing forestry work, a military vehicle (e.g., a combat engineering vehicle (CEV), etc.) for performing military work, an all-terrain vehicle (ATV), a snowmobile, or any other vehicle operable off paved roads. Although operable off paved roads, the vehicle 10 may also be operable on paved roads in some cases.

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

In case of any discrepancy, inconsistency, or other difference between terms used herein and terms used in any document incorporated by reference herein, meanings of the terms used herein are to prevail and be used.

Although various embodiments and examples have been presented, this was for purposes of description, but should not be limiting. Various modifications and enhancements will become apparent to those of ordinary skill in the art.

The invention claimed is:

1. A track system for a vehicle, the track system comprising:
  a track that is elastomeric and comprises a ground-engaging outer surface and an inner surface opposite to the ground-engaging outer surface; and
  a track-engaging assembly configured to drive and guide the track around the track-engaging assembly, the track-engaging assembly comprising a plurality of track-contacting wheels and being configured such that a given one of the track-contacting wheels is pivotable about a virtual pivot axis transverse to and below an axis of rotation of the given one of the track-contacting wheels.

2. The track system of claim 1, wherein: the track comprises a plurality of drive/guide projections projecting from the inner surface; and the virtual pivot axis is below a top surface of each drive/guide projection.

3. The track system of claim 2, wherein the virtual pivot axis is below a midpoint of the drive/guide projection in a heightwise direction of the track system.

4. The track system of claim 1, wherein the virtual pivot axis is closer to the inner surface of the track than to the axis of rotation of the given one of the track-contacting wheels in a heightwise direction of the track system.

5. The track system of claim 1, wherein the virtual pivot axis is closer to a bottom of the given one of the track-contacting wheels than to the axis of rotation of the given one of the track-contacting wheels in a heightwise direction of the track system.

6. The track system of claim 1, wherein: the given one of the track-contacting wheels is a first one of the track-contacting wheels; the track-engaging assembly is configured such that a second one of the track-contacting wheels is spaced from the first one of the track-contacting wheels in a widthwise direction of the track system and pivotable about the virtual pivot axis, which is transverse to and below an axis of rotation of the second one of the track-contacting wheels, together with the first one of the track-contacting wheels.

7. The track system of claim 1, wherein the track-engaging assembly comprises a bogie supporting the given of the track-contacting wheels and comprising a linkage mechanism that implements the virtual pivot axis.

8. The track system of claim 7, wherein the linkage mechanism is a four-bar linkage mechanism.

9. The track system of claim 7, wherein the linkage mechanism comprises a first link, a second link, a third link, and a fourth link that are pivotally interconnected.

10. The track system of claim 9, wherein the second link and the third link converge from the first link towards the fourth link.

11. The track system of claim 7, wherein the linkage mechanism comprises a dampener configured to dampen vibrations.

12. The track system of claim 9, wherein: the linkage mechanism comprises a plurality of pivot points between respective ones of the first link, the second link, the third link, and the fourth link; and the linkage mechanism comprises a plurality of resilient members configured to at least one of absorb and dampen vibrations and disposed at respective ones of the pivot points.

13. The track system of claim 2, wherein: a given one of the drive/guide projections comprises a lateral surface facing the given one of the track-contacting wheels; and the given one of the track-contacting wheels occupies a majority of a distance between the lateral surface of the given one of the drive/guide projections and a lateral edge of the track in a widthwise direction of the track system.

14. The track system of claim 2, herein: a given one of the drive/guide projections comprises a lateral surface facing the given one of the track-contacting wheels; and a ratio of (i) a dimension of a gap between the given one of the track-contacting wheels and the lateral surface of the given one of the drive/guide projections in a widthwise direction of the track system in a rest position of the given one of the track-contacting wheels over (ii) a width of the given one of the track-contacting wheels in the widthwise direction of the track system is no more than 5%.

15. The track system of claim 2, wherein: a given one of the drive/guide projections is configured to pass between the first one of the track-contacting wheels and the second one of the track-contacting wheels and comprises a first lateral surface facing the first one of the track-contacting wheels and a second lateral surface facing the second one of the track-contacting wheels; the first one of the track-contacting wheels occupies a majority of a distance between the first lateral surface of the given one of the drive/guide projections and a first lateral edge of the track in a widthwise direction of the track system; and the second one of the track-contacting wheels occupies a majority of a distance between the second lateral surface of the given one of the drive/guide projections and a second lateral edge of the track in the widthwise direction of the track system.

16. The track system of claim 1, wherein the virtual pivot axis is substantially parallel to a longitudinal direction of the track system.

17. The track system of claim 1, wherein the track-contacting wheels comprise a drive wheel configured to drive the track, a front idler wheel and a rear idler wheel configured to guide the track, and a plurality of roller wheels disposed between the front idler wheel and the rear idler wheel in a longitudinal direction of the track system and configured to roll on a bottom run of the track; and the given one of the track-contacting wheels is a given one of the roller wheels.

18. A track system for a vehicle, the track system comprising:
a track that is elastomeric and comprises a ground-engaging outer surface and an inner surface opposite to the ground-engaging outer surface, the track comprising a plurality of drive/guide projections projecting from the inner surface; and
a track-engaging assembly configured to drive and guide the track around the track-engaging assembly, the track-engaging assembly comprising a plurality of track-contacting wheels and being configured such that a given one of the track-contacting wheels is pivotable about a pivot axis transverse to and below an axis of rotation of the given one of the track-contacting wheels, and below a top surface of each drive/guide projection when the track system is assembled.

19. A track system for a vehicle, the track system comprising:
a track that is elastomeric and comprises a ground-engaging outer surface and an inner surface opposite to the ground-engaging outer surface; and
a track-engaging assembly configured to drive and guide the track around the track-engaging assembly, the track-engaging assembly comprising a plurality of track-contacting wheels and being configured such that a given one of the track-contacting wheels is pivotable about a pivot axis transverse to and below an axis of rotation of the given one of the track-contacting wheels, the pivot axis being closer to the inner surface of the track than to the axis of rotation of the given one of the track-contacting wheels in a heightwise direction of the track system when the track system is assembled.

20. A track system for a vehicle, the track system comprising:
a track that is elastomeric and comprises a ground-engaging outer surface and an inner surface opposite to the ground-engaging outer surface; and
a track-engaging assembly configured to drive and guide the track around the track-engaging assembly, the track-engaging assembly comprising a plurality of track-contacting wheels and being configured such that a given one of the track-contacting wheels is pivotable about a pivot axis transverse to and below an axis of rotation of the given one of the track-contacting wheels, the pivot axis being closer to a bottom of the given one of the track-contacting wheels than to the axis of rotation of the given one of the track-contacting wheels in a heightwise direction of the track system when the track system is assembled.

* * * * *